US008372240B2

(12) United States Patent
Jallon et al.

(10) Patent No.: US 8,372,240 B2
(45) Date of Patent: Feb. 12, 2013

(54) PRODUCTION LINE FOR HYDRAULIC BINDER-BASED, TAPERED-EDGE BOARDS

(75) Inventors: Paul Jallon, Bordeaux (FR); Jean-Louis Laurent, Bayas (FR); Frederic Peronnet, Montussan (FR); Roger Arese, L'Isle sur la Sorgue (FR); Lionel Zbinden, L'Isle sur la Sorgue (FR); Emmanuel Vial, Nimes (FR); Loic Martin, Le Thor (FR)

(73) Assignee: Lafarge Platres, Avignon Cedex (FR)

( * ) Notice: Subject to any disclaimer, the term of this patent is extended or adjusted under 35 U.S.C. 154(b) by 134 days.

(21) Appl. No.: 12/539,005

(22) Filed: Aug. 11, 2009

(65) Prior Publication Data

US 2009/0294067 A1 Dec. 3, 2009

Related U.S. Application Data

(60) Division of application No. 11/358,028, filed on Feb. 22, 2006, which is a continuation-in-part of application No. PCT/FR2004/001265, filed on May 21, 2004.

(30) Foreign Application Priority Data

| | | |
|---|---|---|
| Aug. 25, 2003 | (EP) | 03292089 |
| Feb. 24, 2004 | (EP) | 04290493 |
| Feb. 24, 2004 | (EP) | 04290495 |

(51) Int. Cl.

| | |
|---|---|
| ***B44C 3/08*** | (2006.01) |
| ***B44C 5/04*** | (2006.01) |
| ***B28B 19/00*** | (2006.01) |
| ***B32B 13/00*** | (2006.01) |
| ***B32B 37/00*** | (2006.01) |
| ***B32B 38/04*** | (2006.01) |
| ***B32B 38/10*** | (2006.01) |
| ***B29C 65/00*** | (2006.01) |

(52) U.S. Cl. ......... 156/347; 156/220; 156/510; 428/157

(58) Field of Classification Search .................. 156/220, 156/347, 510; 428/157

See application file for complete search history.

(56) References Cited

U.S. PATENT DOCUMENTS (Continued)

FOREIGN PATENT DOCUMENTS

| | | | |
|---|---|---|---|
| CA | 1 204 279 | A | 5/1986 |
| CA | 2147118 | A1 | 5/1994 |

(Continued)

OTHER PUBLICATIONS

Form PCT/ISA/210 (International Search Report) of PCT/FR2004/001265 dated Mar. 14, 2005 (with English translation of category of cited documents).

(Continued)

*Primary Examiner* — Michael Orlando

(74) *Attorney, Agent, or Firm* — Buchanan Ingersoll & Rooney PC

(57) ABSTRACT

The subject of the invention is a novel plasterboard and its manufacturing processes. The novel board comprises, on one side, two first parallel feathered edges and, on the other side, two other, second, parallel feathered edges that are perpendicular to the first ones; or, on one side, two first parallel feathered edges and, either on the same side or on the other side, two second parallel feathered edges that are perpendicular to the first ones, the said other parallel feathered edges having a width of between 100 and 200 mm; or, on one side, two first parallel feathered edges and, either on the same side or on the other side, two second parallel feathered edges that are perpendicular to the first ones, the said second parallel feathered edges having a width such that the ratio of the width of the said second parallel feathered edges to the width of the said first parallel feathered edges is between 1.5 and 5.

10 Claims, 16 Drawing Sheets

U.S. PATENT DOCUMENTS

| | | | |
|---|---|---|---|
| 1,439,289 | A | 12/1922 | Buttress |
| 1,676,318 | A | 7/1928 | Birdsey |
| 1,754,429 | A | 4/1930 | Knode |
| 1,856,932 | A | 5/1932 | Shaw |
| 1,856,936 | A | 5/1932 | Turner |
| 1,871,563 | A | 8/1932 | Ericson |
| 2,044,234 | A | 6/1936 | Walper |
| 2,168,803 | A | 8/1939 | Page |
| 2,238,017 | A | 4/1941 | Duncan |
| 2,246,987 | A | 6/1941 | Roos |
| 2,537,509 | A | 1/1951 | Camp |
| 2,712,169 | A | 7/1955 | Buttress |
| 2,991,824 | A | 7/1961 | Loechl |
| 2,991,825 | A | 7/1961 | Hampson |
| 2,991,826 | A | 7/1961 | Armstrong |
| 3,050,104 | A | 8/1962 | Burt |
| 3,373,065 | A | 3/1968 | Gutzman et al. |
| 4,397,123 | A | 8/1983 | Parker |
| 4,626,389 | A | 12/1986 | Lempfer et al. |
| 4,781,558 | A | 11/1988 | Betzner |
| 5,842,280 | A | 12/1998 | Robell |
| 5,851,634 | A | 12/1998 | Andersen et al. |
| 5,975,280 | A | 11/1999 | Cote et al. |
| 6,342,284 | B1 | 1/2002 | Yu et al. |
| 7,033,431 | B2 | 4/2006 | Martin et al. |
| 2001/0044016 | A1 | 11/2001 | Watras |
| 2003/0084633 | A1 | 5/2003 | Zuber et al. |
| 2003/0175478 | A1 | 9/2003 | Leclecq |
| 2003/0211305 | A1 * | 11/2003 | Koval et al. ................ 428/292.4 |
| 2003/0217799 | A1 | 11/2003 | Falinower |
| 2004/0007307 | A1 | 1/2004 | Falinower |
| 2005/0127545 | A1 | 6/2005 | Jallon et al. |
| 2005/0139052 | A1 | 6/2005 | Jallon et al. |
| 2005/0224154 | A1 | 10/2005 | Capron |
| 2005/0257873 | A1 | 11/2005 | Arese et al. |

FOREIGN PATENT DOCUMENTS

| | | | |
|---|---|---|---|
| CL | 1804-98 | | 5/2012 |
| DE | 872 025 | | 3/1953 |
| DE | 2 325 158 | | 12/1974 |
| DE | 36 34 533 | A1 | 4/1988 |
| DE | 42 09 594 | A1 | 9/1993 |
| EP | 0 482 810 | A1 | 4/1992 |
| EP | 1 143 084 | A2 | 10/2001 |
| EP | 1 338 393 | A1 | 8/2003 |
| EP | 1 361 030 | A1 | 11/2003 |
| FR | 2 448 422 | | 9/1980 |
| GB | 429084 | | 5/1935 |
| GB | 429379 | | 5/1935 |
| GB | 429380 | | 5/1935 |
| GB | 451389 | | 8/1936 |
| GB | 2 050 917 | A | 1/1981 |
| GB | 2 221 181 | A | 1/1990 |
| JP | 53-51227 | | 5/1978 |
| JP | 2000-288979 | A | 10/2000 |
| SU | 285113 | | 5/1971 |
| SU | 787173 | | 12/1980 |
| SU | 1476505 | A1 | 4/1989 |
| WO | WO 94/27001 | A1 | 11/1994 |
| WO | WO 02/068197 | A1 | 9/2002 |
| WO | WO 03/072326 | A2 | 9/2003 |
| WO | WO 03/084724 | A1 | 10/2003 |
| WO | WO 03/092976 | A1 | 11/2003 |
| WO | WO 2004/007162 | A1 | 1/2004 |
| WO | WO 2004/009309 | A2 | 1/2004 |
| WO | WO 2004/030879 | A2 | 4/2004 |

OTHER PUBLICATIONS

Form PCT/ISA/237 (International Preliminary Report of the Searching Authority) of PCT/FR2004/001265 dated Mar. 14, 2005.

Translation of the International Preliminary Report on Patentability, PCT/FR2004/001265.

Chinese Office Action (English translation only) of Application No. 03804657.1.

European Search Report of EP 04 02 7078 dated Dec. 5, 2006 (with English translation of category of cited documents).

Russian Federation Office Action of Application No. 2004128450 dated Feb. 25, 2003 (English translation only).

* cited by examiner

FIG_2
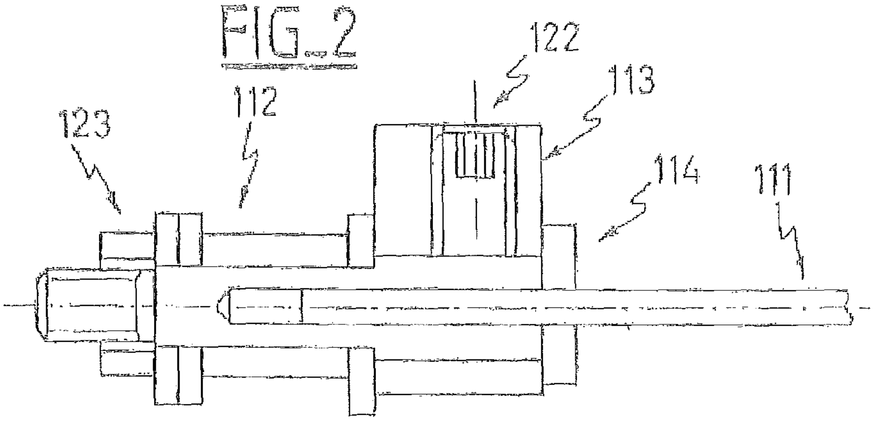
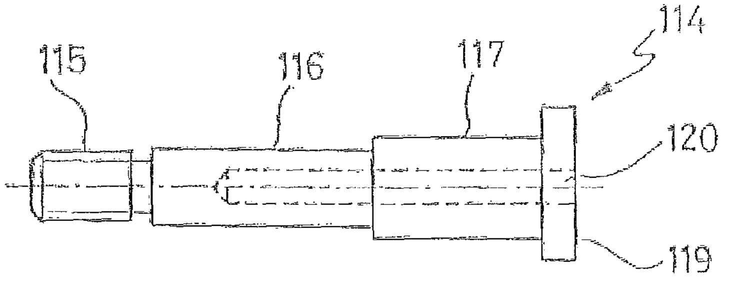
FIG_3
FIG_5
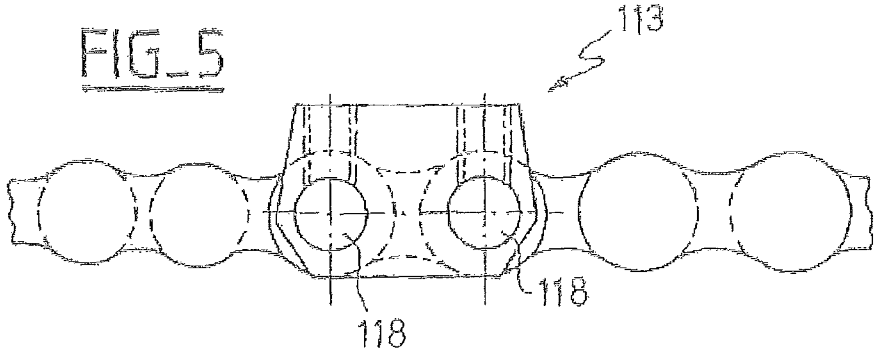
FIG_4
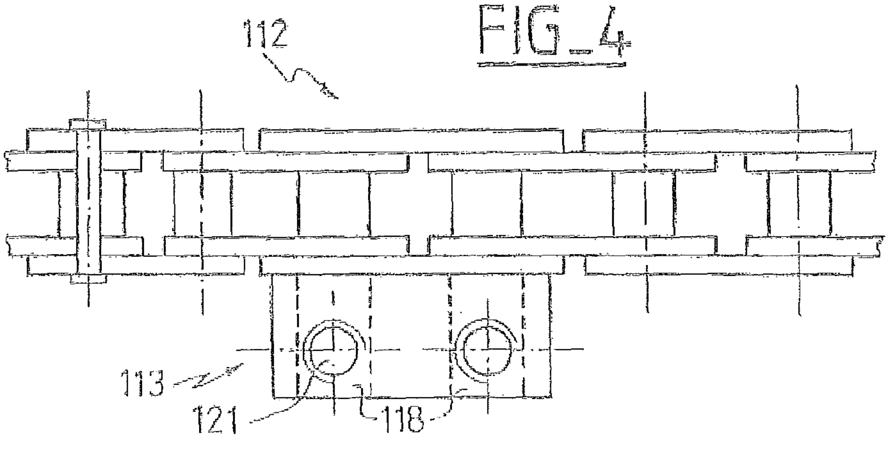

PRODUCTION LINE FOR HYDRAULIC BINDER-BASED, TAPERED-EDGE BOARDS

RELATED APPLICATION

The present application is a division of U.S. application Ser. No. 11/358,028, filed Feb. 22, 2006, which is a continuation-in-part of PCT/FR04/001265, filed May 21, 2004, the contents of which are incorporated by reference.

FIELD OF THE INVENTION

The invention relates to a process for manufacturing hydraulic-binder-based boards and to a line for producing hydraulic-binder-based boards using this apparatus.

The invention also relates to a novel plasterboard having a particular geometry.

U.S. Pat. No. 4,781,558 describes an apparatus intended for manufacturing plasterboards with recesses. It therefore proposes the forming, on a preform intended to be cut in order to give plasterboards, of recesses by means of a drum 34 having bosses 36 (see especially FIG. 1 of that patent). The depth of the recesses is therefore determined by the size of the bosses. Thus, to change the depth and/or the shape of these recesses, it would be necessary to replace the drum 34 with another drum having bosses of different size and/or shape. That document is particularly intended for the production of a particular surface finish of the plasterboards; it does not mention the particular application of producing an impression in the form of a feathering, transversely with respect to the axis of the board, on the back of the latter (namely in this case the upper side).

In U.S. Pat. No. 2,991,824, impressions 51A, 51B are made in a preform that is intended to be cut to give plasterboards, by means (see especially FIG. 1 and column 3, lines 29 to 43 of that patent) of a band 20 rotating about two rollers 21 and having a protuberance 25. The preform is then cut in the middle of the impressions so as to produce boards with feathered ends or transverse feathered edges.

In U.S. Pat. No. 2,246,987, impressions are made in a preform that is intended to be cut in order to give plasterboards, by means (see especially FIGS. 1 and 7) of a band 20 having a plurality of protuberances 23, 38. In one embodiment, impressions are made on both sides of the board at the same time.

In this case too, in order to change the dimensions and/or shape of the impressions, it would be necessary to replace the band 20 with another band having protuberances of different size and/or shape.

The object of the invention is to solve the problem of making impressions in a preform, while still offering the possibility for the size and/or shape of these impressions to be easily and quickly changed.

The object of the invention is also to solve the problem of making impressions in a preform using a process generally of the type of that described in U.S. Pat. No. 2,991,824, allowing the production of feathered ends or transverse feathered edges in a satisfactory manner.

SUMMARY OF THE INVENTION

The invention therefore provides a novel board made of a hydraulic binder with a facing on each of its sides, having, on one side, two first parallel feathered edges (10) and, on the other side, two other parallel transverse feathered ends or feathered edges (25*a*) that are perpendicular to the first ones.

The invention also provides a novel board made of a hydraulic binder with a facing on each of its sides, having, on one side, two first parallel feathered edges (10) and, either on the same side or on the other side, two second parallel feathered edges (25*a*) that are perpendicular to the first ones, the said other parallel feathered edges (25*a*) having a width of between 100 and 200 mm.

The invention also provides a novel board made of a hydraulic binder with a facing on each of its sides, having, on one side, two first parallel feathered edges (10) and, either on the same side or on the other side, two second parallel feathered edges (25*a*) that are perpendicular to the first ones, the said second parallel feathered edges (25*a*) having a width such that the ratio of the width of the said second parallel feathered edges (25*a*) to the width of the said first parallel feathered edges (10) is between 1.5 and 5.

The invention also provides a method of constructing an interior structure using this board, and also a process and a device for manufacturing this board.

The invention also provides a process and devices for manufacturing boards made of a hydraulic binder having four feathered edges on the same side.

More specifically, the invention uses in particular a device for producing an impression or pocket in a preform based on a hydraulic binder. This apparatus therefore comprises at least:

- a frame;
- two first pulleys supported at a first end of the frame and two second pulleys at a second end of the frame; the first pulleys and second pulleys being in parallel planes; the pulleys facing each other being identical;
- two transmission belts wrapped respectively around the first pulleys and the second pulleys; and
- at least one wire fixed removably to the belts and extending between these belts, in such a way that its longitudinal axis is parallel to the axis of rotation of the pulleys.

Thanks to this apparatus, it is therefore sufficient simply to detach the removable means and to replace them with others having a different size and/or shape in order to change the size and/or shape of the impressions produced in the preform.

Furthermore, the use of such an apparatus allows the spacing between two impressions, and therefore the length of the boards, to be easily varied.

The subject of the invention is also a process for manufacturing a hydraulic-binder-based board from a preform intended to be cut up, this process including a step during which an impression is made in the preform by means of an apparatus according to the invention.

This process has the advantage in particular of making it possible to obtain boards with feathered edges in which board the transverse feathered edges may be on the same side as the conventional feathered edges or on the opposite side.

Finally, the subject of the invention is also a line for producing hydraulic-binder-based boards from a preform comprising a facing material covered with a hydraulic binder composition and supported by a conveyor belt (or forming belt). This production line also has the advantage of allowing boards with feathered edges to be produced.

BRIEF DESCRIPTION OF THE DRAWINGS

Other features and advantages of the invention will now be described in detail in the description that follows, this being given with reference to the figures in which: (Xbis and Xter in the drawings mean Xa and Xb in the specification of FIGS. 6, 8, 10, 15 . . . )

FIG. 2 shows schematically and in cross section the assembly of a wire onto a chain link;

FIG. 3 shows schematically a wire gripper pin;

FIG. 4 shows schematically and in a view from above a support piece mounted on a chain link;

FIG. 5 shows schematically the support piece of FIG. 4, viewed from the front;

DETAILED DESCRIPTION OF EMBODIMENTS OF THE INVENTION

Apparatus According to Embodiments of the Invention

Figure 1:
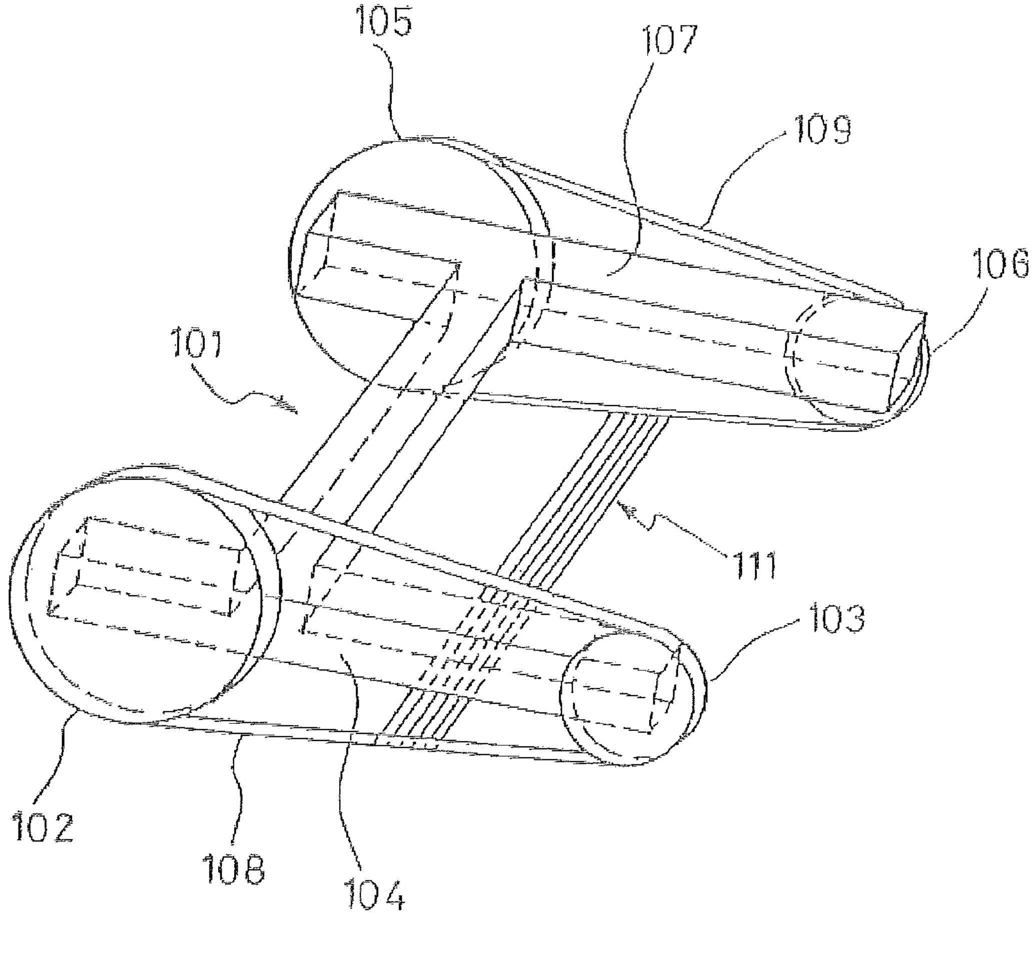
FIG. 1 shows schematically and in perspective the apparatus according to the invention.

The apparatus according to the invention is shown schematically in FIG. 1.

It comprises a frame 101 in the shape of an H but which can easily be given numerous other shapes by the person skilled in the art.

Supported on this frame 101 are, at a first end 104, two first pulleys 102 and 103 and, at a second end 107, two second pulleys 105 and 106.

The first pulleys 102, 103 lie in a first plane, the second pulleys 105, 106 in a second plane and the first plane is parallel to the second plane.

The pulley 102 and the pulley 105 are situated one facing the other and are of identical size.

The pulley 103 and the pulley 106 are also situated one facing the other and are of identical size.

The pulleys 102, 103, 105 and 106 can rotate about themselves.

A first transmission belt 108 is wrapped around the first pulleys 102, 103 and a second transmission belt 109 is wrapped around the second pulleys 105, 106.

The transmission belts 108 and 109 are identical. They are connected together by at least one wire 111.

This wire 111 is fixed removably to the first and second belts 108, 109 so that its longitudinal axis is parallel to the axis of rotation of the pulleys.

Thus, when one of the pulleys, for example the pulley 102, turns, it drives the transmission belt 108 which itself drives the other pulley lying in the same plane as it (the pulley 103) and the means of elongate shape 110. The latter therefore moves along the path defined, on the one hand, by the loop consisting of the belt 108 and, on the other hand, as it is connected to the second belt 109, also by the loop consisting of the latter.

The symmetry of the apparatus according to the invention therefore allows the axis of the wire 111 to move in an elliptical path, its axis remaining constantly parallel to that of the pulleys.

Provision may be made for two pulleys situated one facing the other to be fixed on one and the same shaft.

The apparatus may also comprise means for driving the rotation of at least one of the pulleys. These means may possibly drive two pulleys by means of the shaft on which they are mounted.

The wire 111 generally has a cylindrical shape, but it may adopt a great many shapes among which mention may be made of those that are parallelepipedal, prismatic, board-shaped, etc.

It may be fixed for example by screwing to the transmission belts so as to be able to be unscrewed and replaced easily by another means of elongate shape.

According to a preferred embodiment of the invention, several wires 111 are arranged parallel to one another along the transmission belts 108 and 109 (see FIG. 1) and are fixed in a removable manner. They are preferably spaced apart.

The pulleys are preferably sprockets and the transmission belts chains able to cooperate with these sprockets.

The wires may then be fixed in the way illustrated in FIG. 2.

This FIG. 2 shows a wire 111 held on a chain link 112 by means of a support piece 113 and a wire gripper pin 114.

The latter, in the chain link 112, replaces one of the roller bearing pins conventionally used.

The wire gripper pin 114 is shown in detail in FIG. 3. It comprises, in order:

- a threaded end 115,
- a generally cylindrical and plain part 116 able to be introduced into the roller of the chain link 112 to replace the roller bearing pin conventionally used,
- a plain part also generally cylindrical and plain 117, of a diameter generally greater than that of the part 116 and able to be introduced into the hole 118 in the support piece 113 (see FIGS. 4 and 5), a head 119, and a central bore 120 machined generally from the head 119, able to extend as far as the part 116 and intended to house the wire 111.

The support piece 113 is visible in FIGS. 2, 4 and 5.

It comprises the hole 118 able to cooperate with the corresponding part 117 of the wire gripper pin 114 and a bore 121 opening into the hole 118. This bore 121 is threaded so that a pressure screw 122 can be screwed into it in order to compress the wire 111 present inside the hole 118 with a view to holding it firmly (see FIG. 2).

Thus, to fix a wire 111 to the chain link 112, the set-up of FIG. 2 is achieved. To do that, all that is required is for the part 117 of the wire gripper pin 114 to be introduced into the support piece 113, for the normal roller bearing pin of the link 112 to be removed, for the part 116 of the wire gripper pin 114 to be introduced along the axis of the roller, and for the assembly to be tightened by screwing a nut 123 onto the end 115 of the wire gripper pin 114, for the wire 111 to be introduced into the central bore 120 of the wire gripper pin 114 and for it to be held there firmly by screwing the pressure screw 122 into the threaded bore 121 until it effectively compresses the wire 111.

Of course the wire gripper pin 114 is mounted in such a way that its head 119 is on the inside of the chain, that is to say on the side facing towards the other chain.

The support piece 113 preferably comprises two pairs (hole 118, threaded bore 121), the spacing between the axes of the holes 118 corresponding to the normal spacing between the axes of the rollers of a chain link 112, so that two wires 111 can be held on the same link 112, as can be deduced from FIGS. 4 and 5.

By thus having several identical support pieces 113 on adjacent links, it is possible to align several wires 111 in parallel so as to constitute a means of elongate shape.

To produce the impressions, another known device, for example that forming the subject-matter of U.S. Pat. No. 2,991,824, could be used.

Process According to Embodiments of the Invention

The apparatus according to the invention may be used, in a process for manufacturing hydraulic-binder-based boards, to make an impression in the preform intended to be cut in order to give the hydraulic-binder-based boards.

The preform is then preferably cut at the impression or opposite the place where this impression has been made (i.e. on the other side of the preform).

The apparatus according to the invention can be used in a process for manufacturing plasterboards with feathered edges.

Such a process is illustrated by FIGS. 6 to 10. It comprises the following steps:

1) a hydraulic binder composition (2) is poured onto a facing material (1) supported by a conveyor belt (7) so as to obtain a preform (5), then a lath (6, 23), the length of which is at least approximately equal to the width of the preform (5), is introduced under the preform (5);

2) the hydraulic binder composition (2) is left to set and the said lath (6, 23) is removed;

3) the preform (5) is cut at the feathering (8) created by the lath (6, 23).

This process of manufacturing hydraulic-binder-based boards with feathered edges will now be described in detail with reference to FIGS. 6 to 15. The use of the apparatus according to the invention will then be described in this process.

First of all, it is necessary to emphasize that "transverse edges" in this description are intended to mean the edges perpendicular to the direction of travel of the conveyor belt in a production line for producing hydraulic-binder-based boards. Such transverse edges are also known as "board ends".

Figure 6:
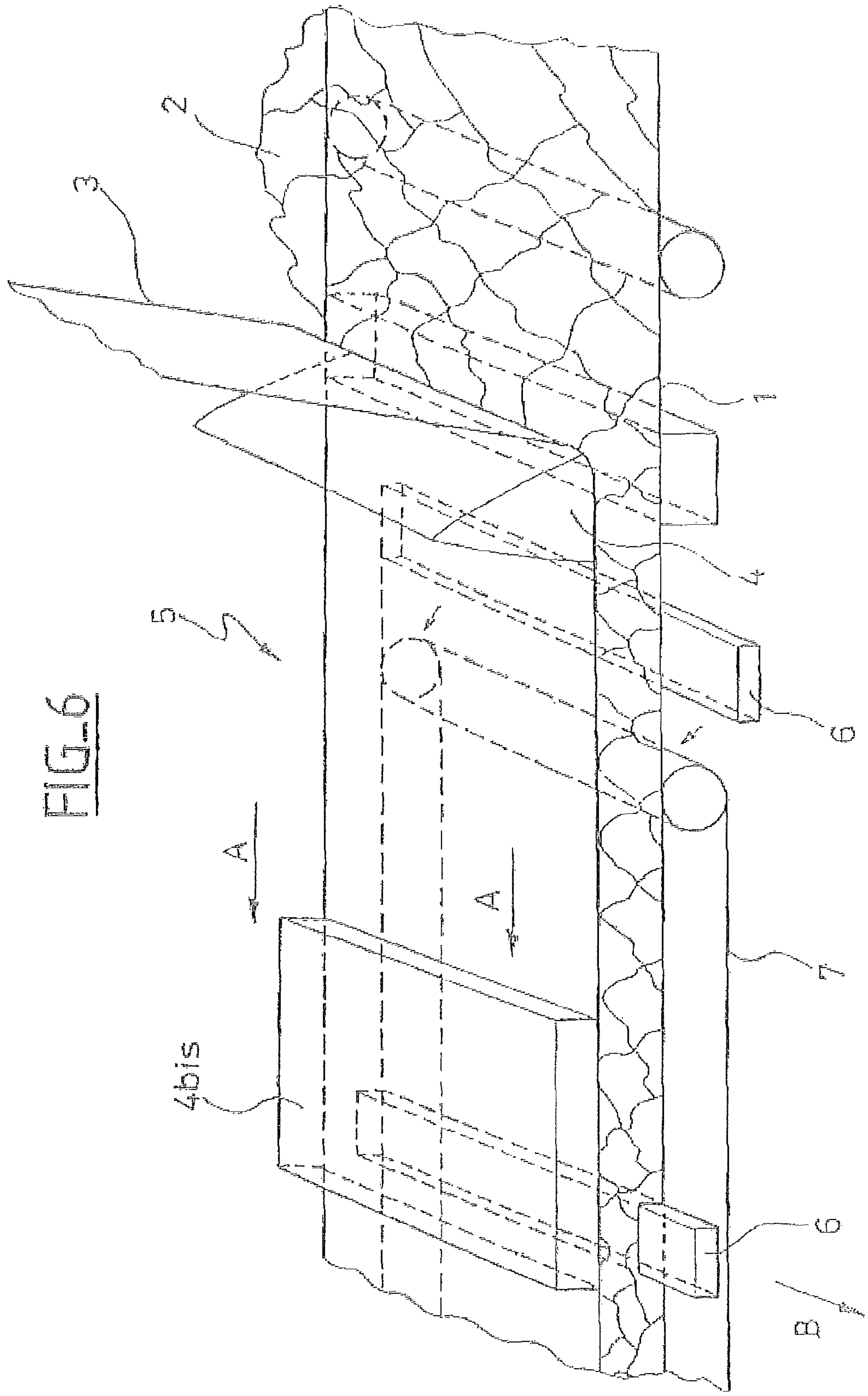
FIG. 6 shows schematically one step of a process for manufacturing hydraulic-binder-based boards.

FIG. 6 shows a line for the production of boards produced by pouring a hydraulic binder composition 2 onto a facing material 1, which boards are generally covered with a second facing material 3. The passage of the assembly beneath the forming plate 4 gives a preform 5.

The hydraulic binder composition preferably comprises gypsum plaster.

The facing materials 1 and 3 may consist of sheets of paper or card, or may consist of mats of glass or of any material known to those skilled in the art as being able to be used as facing material.

After the preform 5 emerges from under the forming plate 4 or from under the equivalent device used in the production line (for example, a forming roll also known as a master roll), a lath 6 is introduced between the preform 5 and the start of the conveyor belt 7. The distance between the forming plate 4 and the start of the conveyor belt 7 is such that the preform 5 has not yet had time to harden appreciably and is still very plastic. Introduction is performed in such a way that the longitudinal axis of the lath 6 is substantially perpendicular to the direction of travel of the conveyor belt 7.

The lath 6 is then driven by the conveyor belt 7, like the preform 5. The gypsum plaster composition 2 then sets hydraulically and hardens throughout the travel of the preform 5, denoted by the arrows A.

As a preference, the lath 6 is removed before the preform 5 is cut.

Thus, after a certain time, to which there corresponds a distance covered by the preform 5 on the conveyor belt 7 that the person skilled in the art knows how to determine as a function of the speed of travel of the conveyor belt 7 and of the time taken for the gypsum plaster composition 2 to set, the hardness of the preform 5 is sufficient that the lath 6 can be removed without deforming the preform 5 and without the gypsum plaster composition 2 filling the space or feathering 8 (FIG. 7) left by the removal of the lath 6.

The lath 6 can be removed in any appropriate way. For example, when the length of the lath 6 exceeds the width of the preform 5, the lath 6 projects from the preform 5, and it can then be removed quickly in a direction substantially perpendicular to the direction of travel of the conveyor belt 7, and away from the latter. This removal action is illustrated by the arrow B in FIG. 6.

The lath 6 may also be removed by causing this lath 6 to drop into the space between two constitutive rollers of the conveyor belt system which, in general, is not continuous along the entire length of the production line but is made up of several belts driven by rollers between which there are gaps.

After the lath 6 has been removed, the preform 5 continues to travel, still driven by the conveyor belt 7, and the gypsum plaster composition 2 continues to harden.

Figure 7:
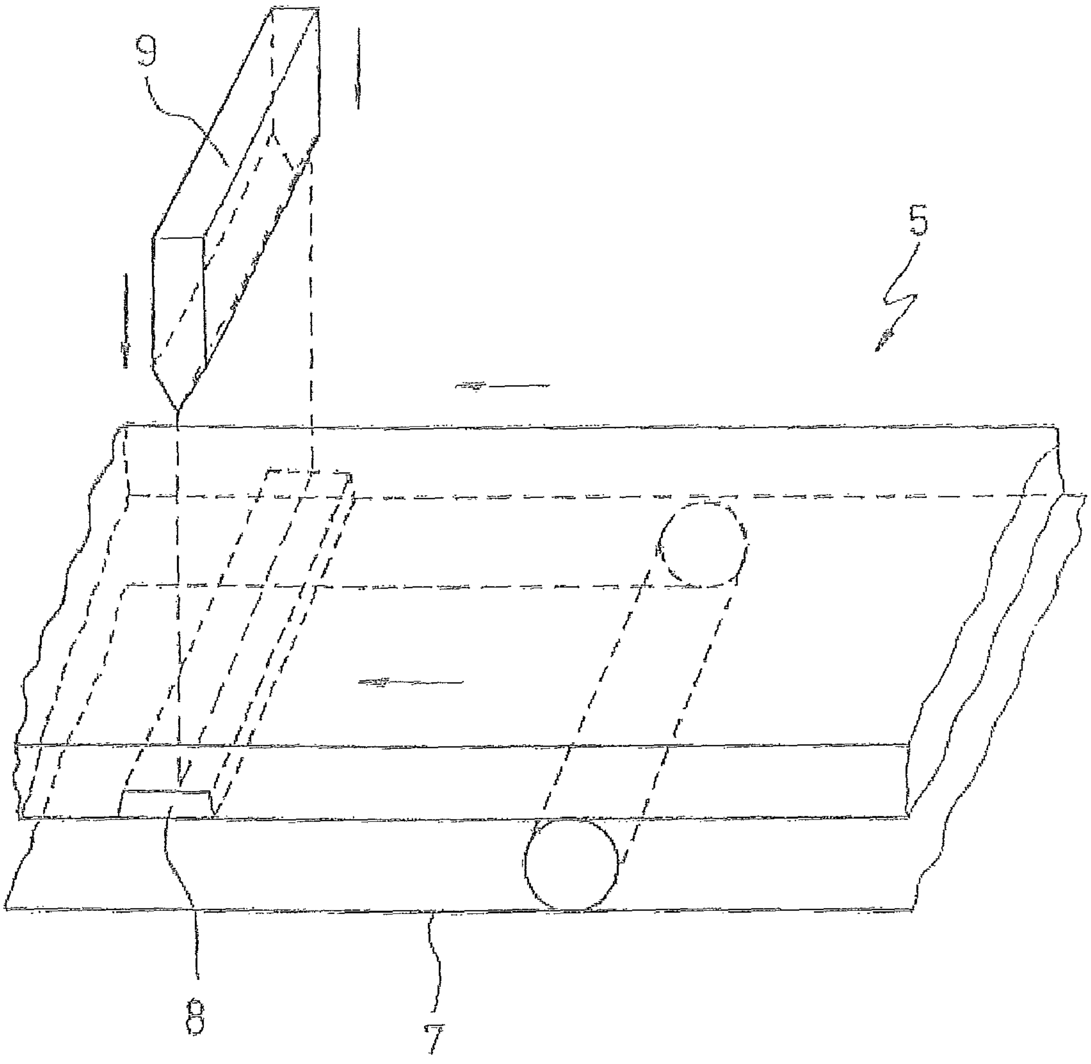
FIG. 7 shows schematically another step of a process for manufacturing hydraulic-binder-based boards.

As may be seen in FIG. 7, when the feathering 8 comes level with the cutting device, generally consisting of a roller fitted with a knife 9, this is operated and cuts the preform 5. What is thus obtained is a board 9*a*, which can be seen in FIG. 8, the length of which is defined by the distance traveled by the conveyor belt between two cutting operations, that is to say, according to the invention, by the distance traveled by the conveyor belt between two consecutive featherings 8. This board 9*a* therefore has two feathered transverse edges 10.

Preferably, the cutting device is set so that the knife 9 cuts the preform 5 approximately in the middle of the feathering 8.

The size of each feathering 8 depends on the size of the lath 6. The latter is generally a parallelepiped generally of between 0.5 and 4 mm and preferably between 1.5 and 4 mm thick. Its width is generally between 5 and 20 cm and its length is at least approximately equal to the width of the preform 5 (possibly reduced by the width of the longitudinal bands (tapes) that might be present), but generally greater so that it can be grasped for removal from under the preform 5. Furthermore, it is desirable for the lath 6 to be longer than the width of the preform 5, so that it projects with respect to the latter, which may make it easier to remove.

The material of which the laths 6 are made is of little importance, provided that it allows these laths to withstand the weight of the thickness of the preform 5 lying on top of each lath 6. It may therefore be made of a plastic, wood, metal, etc., with good resistance to wear and good stability over time.

As a preference, the method which has just been described supplements a known method for manufacturing plasterboards having two feathered longitudinal edges. The latter method generally anticipates the placement of a band, generally made of plastic, and generally known as a tape, along each longitudinal side of the conveyor belt 7. Such a method is described for example in European Patent Application No. 482 810.

Figure 9:
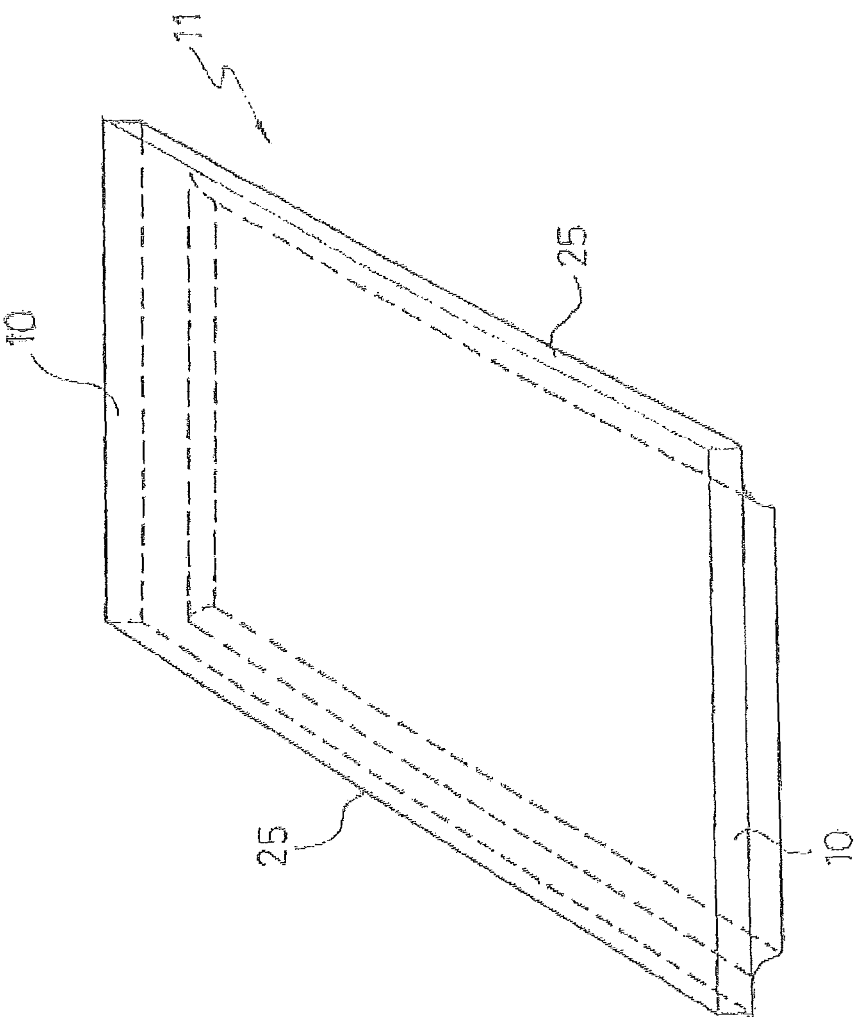
FIG. 9 shows another board that can be obtained using the process according to the invention.
Figure 8:
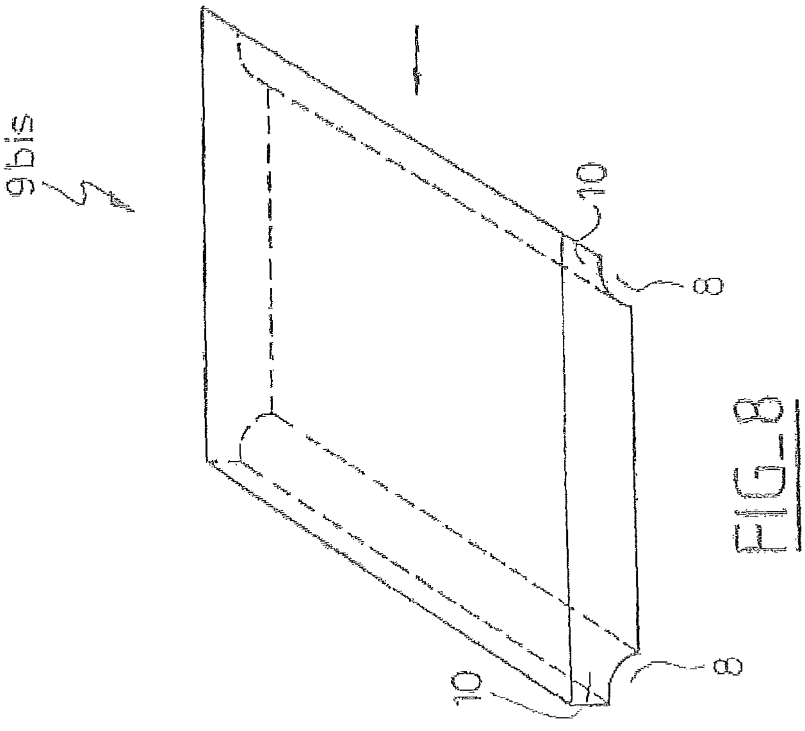
FIG. 8 shows a board that can be obtained using the process according to the invention.

This therefore makes it possible to obtain a hydraulic-binder-based board 11 as illustrated in FIG. 9 which, apart from its two feathered transverse edges 10, has two feathered longitudinal edges 25, namely four feathered edges in total.

It goes without saying that if the frequency of the cutting operations is twice that at which the laths 6 are introduced, boards having three (two longitudinal and one transverse) feathered edges are produced.

The length of the plasterboards manufactured depends of course on the rate of travel of the conveyor belt and on the frequency of the cutting operations.

The frequency of the cutting operations is generally directly connected to the frequency at which the laths are introduced, because in general the desire is to obtain boards with two feathered transverse edges.

This process is very flexible because, in order to change the length of the boards manufactured, it is sufficient simply to alter the frequency at which the laths are introduced.

The process that has just been described uses the apparatus according to the invention to make an impression in the preform intended to be cut to give the hydraulic-binder-based boards.

Figure 10:
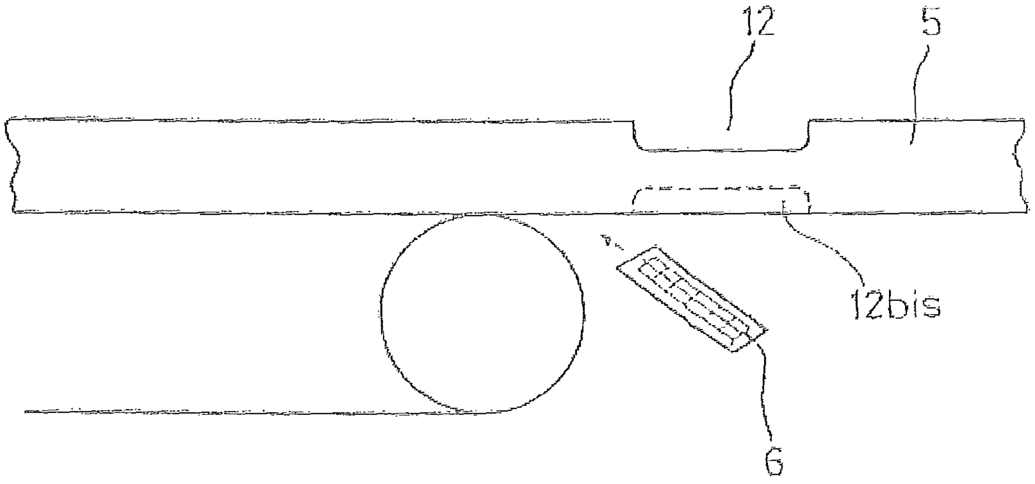
FIG. 10 illustrates an optional intermediate step of a process for manufacturing hydraulic-binder-based boards.

Thus, according to the invention and as is apparent from FIG. 10, before the lath 6 is introduced, an impression 12 is made by means of an apparatus according to the invention in the preform 5 opposite the place where it is intended to insert the lath 6, or an impression 12*a* at the place where it is intended to introduce this lath 6.

In this way it is possible to compensate for the localized overthicknesses that may possibly form in the preform 5, because of a displacement of material, when the lath 6 is large.

A smoother 4*a* of conventional type (which can be seen in FIG. 6) may also be provided downstream of the place where the lath 6 is introduced.

First Embodiment

According to one embodiment, the impression is not used with regard to the introduction of a lath. In such a case, the device for making the impression is used alone in the manufacturing line. The impression made in the preform will result, after the hydraulic binder has set, to a shape having conventional longitudinal feathered edges, and a depression corresponding to the impression. Depending on whether it is the impression 12 or 12*a* involved, this depression is located on the opposite face to that bearing the conventional longitudinal feathered edges, or on the same face. According to the first embodiment, this will preferably be the impression 12, and therefore on the opposite face to that bearing the conventional longitudinal feathered edges. The advantages will be described below in relation to the method of constructing an interior structure according to the invention.

Line for Producing Hydraulic-Binder-Based Boards

The apparatus according to the invention may be used in a line for producing hydraulic-binder-based boards from a preform 5 comprising a facing material 1 covered with a hydraulic binder composition 2 and supported by a conveyor belt 7.

In order for the apparatus according to the invention to be able to be used optimally on the line for producing hydraulic-binder-based boards, the distance between the conveyor belts of this apparatus is at least equal to the width of the preform 5. Thus, these belts and the pulleys are located on each longitudinal side of the preform.

Furthermore, the apparatus according to the invention is placed in an appropriate manner so that, when its transmission belts turn, its elongate means creates an impression in the preform 5.

The apparatus according to the invention may also be above the preform 5, and in this case it creates the impression 12, or beneath the preform 5, in which case it creates the impression 12*a*.

For practical reasons, it is preferred for the apparatus according to the invention to be above the preform 5.

Of course, it would be possible to provide two (or more) apparatuses according to the invention, one being located above the preform and the other beneath it, so as to create, respectively, an impression 12 in the top side of the preform 5 and an impression 12*a* in the underside of the preform 5 (see FIG. 10), the underside of the preform 5 being that side of the preform 5 that rests on the conveyor belt 7.

The cutting device may be set to cut the preform at an impression 12.

If the situation is one in which an impression 12*a* is made in the underside of the preform, the cutting device may be set to cut the preform opposite the place where this impression 12*a* has been made.

Preferably, the line for producing hydraulic-binder-based boards is a line for producing boards with feathered edges. Such a line will now be described in detail with reference to FIGS. 6 to 15. The way in which the apparatus according to the invention is used in this line will then be described afterwards.

Figure 11:
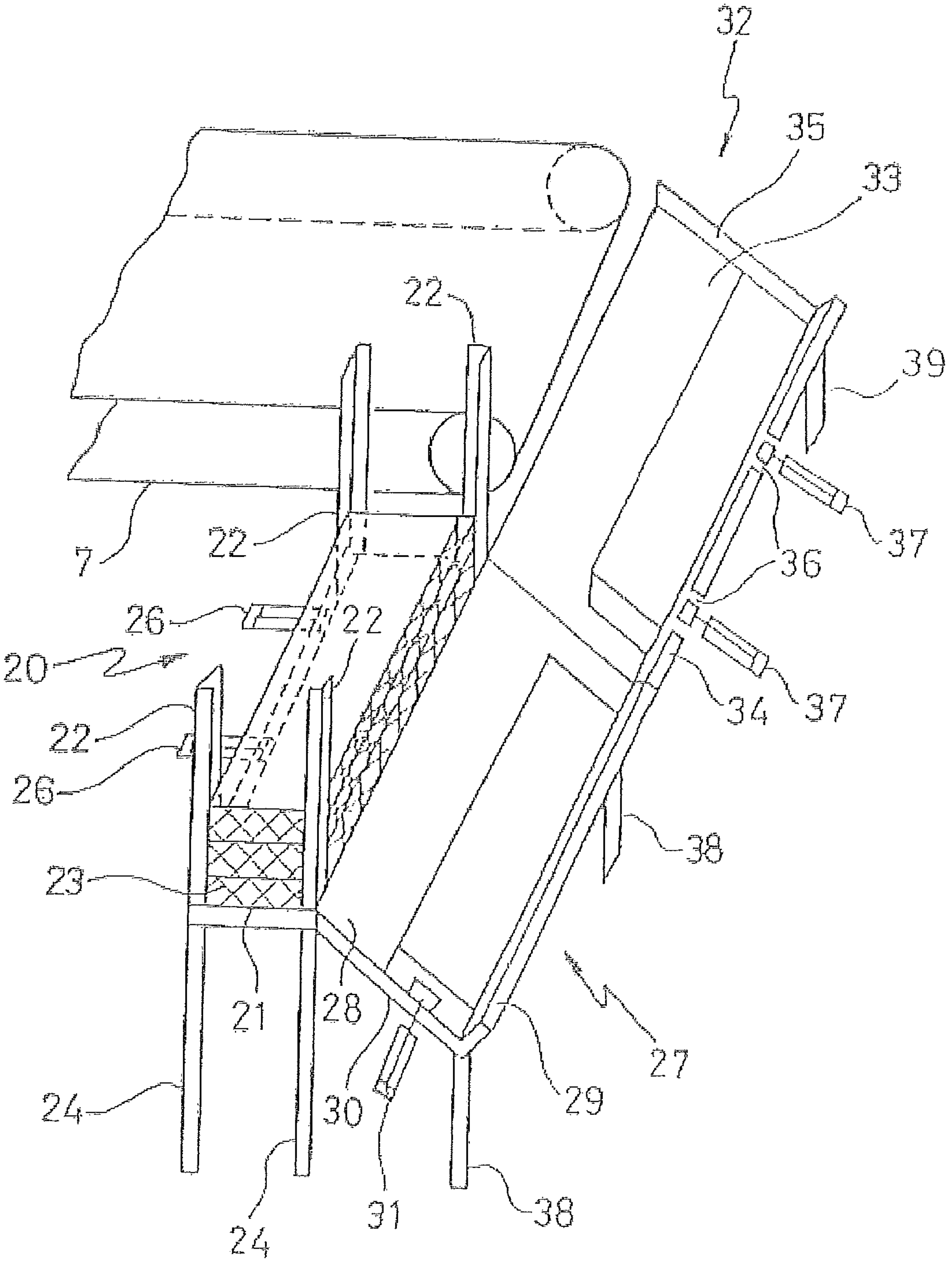
FIG. 11 shows schematically, and in perspective, a part of the line for producing hydraulic-binder-based boards.

FIG. 11 shows part of a line for producing hydraulic-binder-based boards.

It may therefore be seen that there is a laths magazine 20 formed from a horizontal rectangular surface 21 from the corners of which there rise, vertically and in parallel, four bracket-shaped angular pieces 22 facing towards each other, so as to flank a stack of laths 23.

Figure 12:
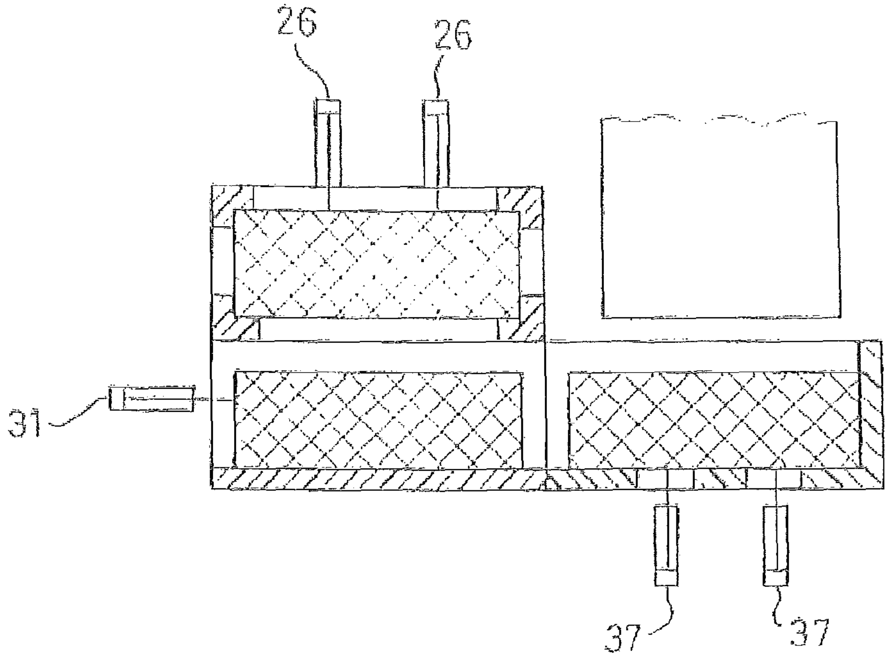
FIG. 12 shows schematically, and in a view from above, a device for introducing laths under a hydraulic-binder-based preform.
Figure 13:
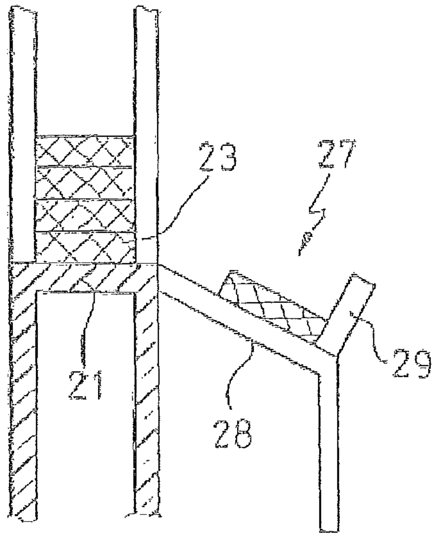
FIG. 13 shows schematically, and in side view, the device of FIG. 12.

The size of this lath magazine 20 is such that it can store a great many laths 23 (see also FIGS. 12 and 13).

The horizontal surface 21 of the lath magazine 20 is supported on legs 24.

At the first lath 23, that is to say the one at the very bottom of the stack, there are, arranged in parallel, two rams 26 which are oriented in such a way as to extract the first lath 23 from the stack by pushing it and causing it to slide towards an inclined plane 27 consisting of a downwardly inclined surface 28 and of a rim 29 at its lower part to retain the lath which has just been extracted and guide it later.

On the transverse side 30 of the inclined plane 27, that is to say on the opposite side to the conveyor belt 7, a ram 31 is arranged parallel to the longitudinal axis of the inclined plane 27 so that actuation of this ram 31 can give an impulse to the lath which has just been extracted from the lath magazine 20. The lath thus propelled can therefore move, sliding parallel to the longitudinal axis of the inclined plane 27, the rim 29 of which guides it, towards a second inclined plane 32 in the continuation of the first inclined plane 27, on the opposite transverse side to the side 30. This second inclined plane 32 also consists of an inclined surface 33 equipped with a rim 34 at its bottom. It further comprises a stop 35 on its opposite end to the ram 31, this stop generally consisting of a pneumatic damper and being intended to end the movement of the lath propelled by the ram 31.

The rim 34 is equipped with openings 36 facing which there are two rams 37 oriented in such a way as to propel the lath positioned on the second inclined plane 32 towards the top of the inclined surface 33.

The first inclined plane 27 and the second inclined plane 32 are supported on legs 38 and 39 respectively.

Figure 14:
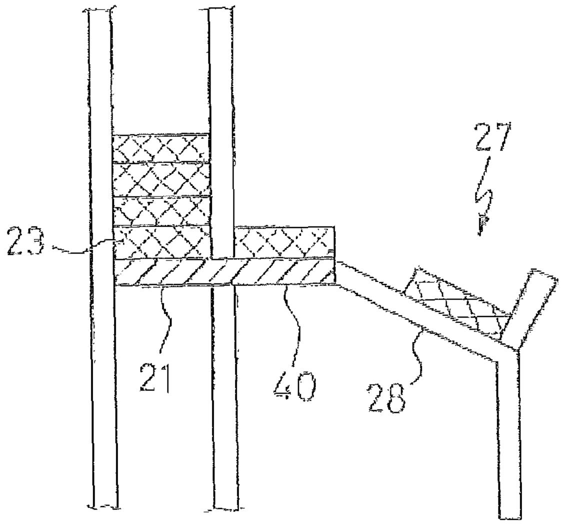
FIG. 14 shows schematically, and in side view, an alternative embodiment of the device of FIG. 12.

According to an alternative form which can be seen in FIG. 14, a flat surface 40 is provided parallel to the surface 23, between this surface and the first inclined plane 27, to horizontally support a lath extracted from the lath magazine 20 before it descends along the inclined surface 28 of the first inclined plane 27.

Figure 15:
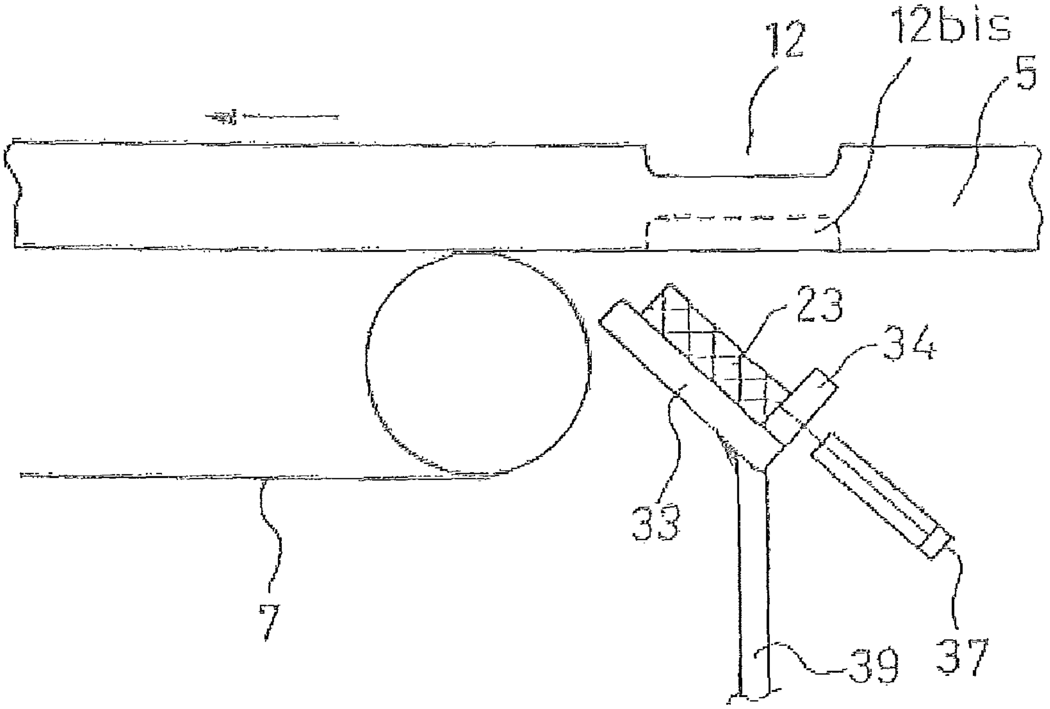
FIG. 15 shows schematically, and in cross section, a detail of the device of FIG. 12 illustrating the introduction of a lath under a hydraulic-binder-based preform.

Thus, as can be seen in FIG. 15, the height of the legs 24, 35 and 36 is chosen so that a lath positioned on the second inclined plane 32 lies at a lower height than the preform 5.

In general:

- the longitudinal axis of the rim 34 of the second inclined plane 32 is perpendicular to the longitudinal axis of the conveyor belt;
- the means 32, 33, 34, 35 for supporting the displaced lath lie facing the start of the conveyor belt 7; and
- the inclined surface 33 of the second inclined plane 32 is adjacent to the conveyor belt 7.

The length of the second inclined plane 32 is at least equal to that of the lath 23, that is to say at least equal to, and preferably greater than, the width of the preform 5.

Thus, as can be understood by referring to FIG. 10, when the rams 37 are actuated, the lath on the second inclined plane 32 is pushed up towards the top of the inclined surface 33, that is to say towards the conveyor belt 7 and the preform 5, and finds itself wedged between these and driven along by them.

The difference between the length of the lath and the width of the preform 5 allows the lath to be grasped and removed once the gypsum plaster composition has hardened.

The production line according to the invention generally comprises electronic means which control its operation and, as necessary, allow the performance of various operations to be slaved to one another.

These electronic means may make provision that, after a lath has been introduced under the preform by actuation of the rams 27, the ram 31 is actuated to introduce another lath onto the second inclined plane 32, then the rams 26 are actuated to introduce another lath onto the first inclined plane 27, and so on. The electronic means may vary the frequency of these operations in order to reduce or increase the length of the plasterboards produced with feathered edges.

Figure 16:
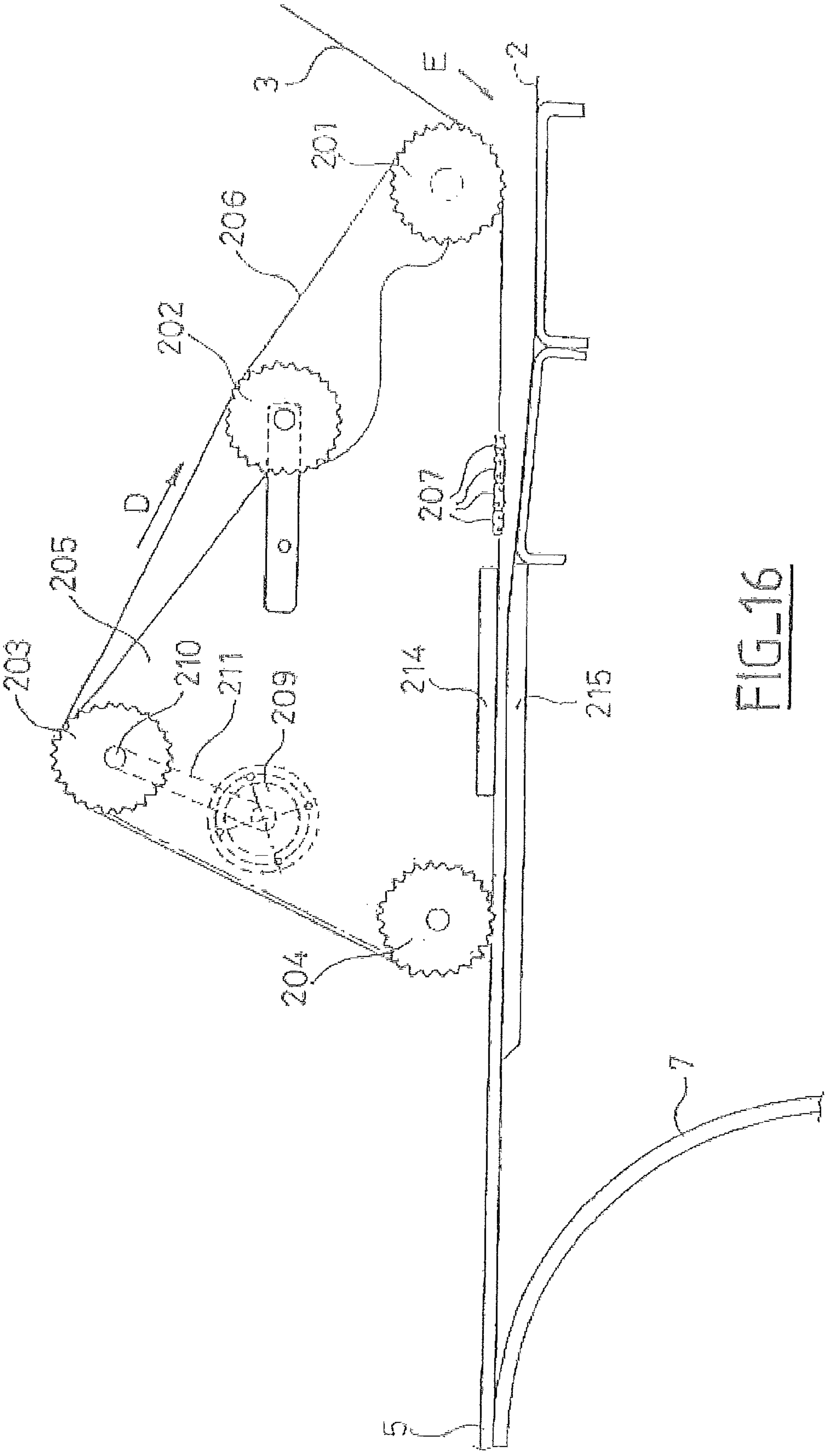
FIG. 16 shows schematically a part of a line for producing hydraulic-binder-based boards according to the invention.

FIG. 16 shows part of a production line according to a preferred embodiment of the invention.

This Figure shows that the production line includes one embodiment of the apparatus according to the invention.

This apparatus, which can be seen in profile in FIG. 16, comprises four first sprockets 201, 202, 203, 204 supported by a frame 205 and with, wrapped around them, a chain 206 made up of links of which some, the links 207, each support two wires, in the way indicated in conjunction with FIG. 2.

This apparatus is symmetrical with respect to a vertical plane aligned with the direction of travel of the preform 5. Thus, the wires held by the links 207 extend transversely with respect to the preform 5 as far as a second chain, identical to the chain 206, and wrapped around second sprockets identical to the first sprockets 201, 202, 203, 204.

The apparatus is equipped with an electric motor 209 driving the rotation, via a belt 211, of the shaft 210 on which the sprocket 203 and its symmetrical sprocket are mounted. The turning of these sprockets drives the rotation of the chain 206 in the direction indicated by the arrow D.

This preform 5 is obtained in a known way by introducing hydraulic binder slurry in the direction of the arrow E between the first facing material 2 and the second facing material 3 and passing the entity between the upper 214 and lower 215 forming plates of the apparatus.

The distance between the sprockets 201, 202, 203, 204 and their symmetrical sprockets is at least equal to that of the preform 5 so that these sprockets do not touch this preform 5.

The apparatus according to the invention is fixed at an appropriate height so that when the production line is operating, the movement of the chain 206 driving the movement of the wires connected to the links 207, these wires pass through the forming plate, that is to say between the plates 214 and 215, and project downwards with respect to the upper plate 214. The space occupied by these wires between the upper plate 214 and the second facing material 3 therefore results at this point in a feathering of the thickness of the preform 5.

It goes without saying that the operation of the motor is adjusted in such a way that the chain 206 moves at the same speed as the preform 5 when the wires pass between the plates 214 and 215. The wires therefore accompany the preform 5 over a few centimeters and, when they separate from it to return, rotating about the sprocket 204, they leave an impression in the upper part of the preform 5.

Given that it is easy to vary the run speed of the chain 206 by acting on the motor, the spacing between two impressions, and consequently the length of the boards, can be easily modified.

The frame 205 of the apparatus according to the invention may, as is clear from FIG. 16, be fastened to the plates 214 and 215. It follows that the apparatus according to the invention may be used instead of a forming plate or a master roll, as used conventionally.

Second Embodiment

This embodiment corresponds to the case in which the lath is introduced no longer before the first forming tape, but between the first and second forming tapes (or possibly between the second and third forming tapes, as the case may be). It will be recalled here that the conveyor belt 7 is generally divided into several elements called forming tapes. The forming tape 1 is that at the front. A conventional conveyor belt comprises in general two or three, or even four, forming tapes. These forming tapes, as indicated above, comprise tapes so as to form the longitudinal feathered edges.

The other elements remain the same (impressions 12 or 12*a*, depending on the case), except that the lath is introduced at a place on the line at the point where the hydration of the hydraulic binder has commenced (see below in the section regarding the third embodiment). The other constituent elements are shifted correspondingly, (for example the smoother 4*a* is shifted to or after the first roller for driving the second forming tape; in this case, the smoother takes the form of a roller having a peripheral speed approximately identical to that of the conveyor belt 7). By injecting the lath (6, 23) at this point, it is possible to have an ideal preform consistency at the moment of this secondary forming operation.

It is also possible to use synchronization means, as described below in the section on the third embodiment.

Third Embodiment

Figure 17:
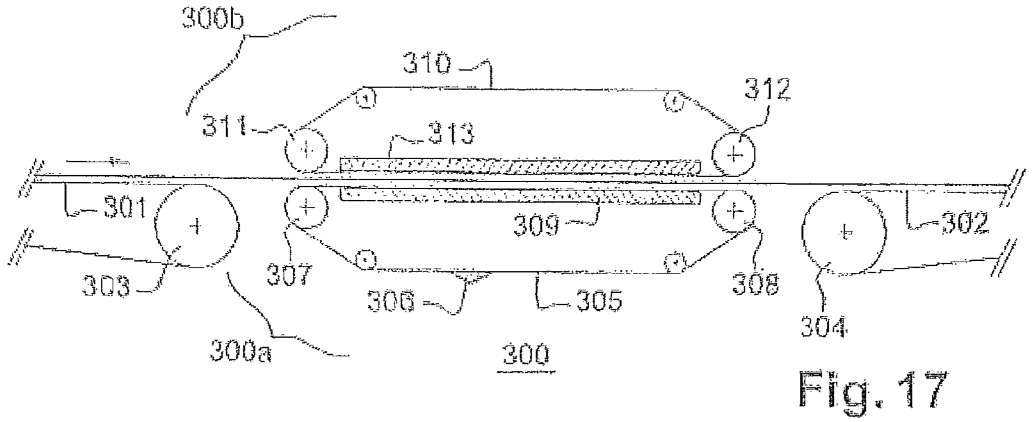
FIG. 17 shows schematically a secondary forming device.

This embodiment is shown in FIG. 17. In this figure, the impression 12 made, in particular by the device according to the invention, is "pushed-in" upwards by a device 300 located beneath the preform. This system is in fact the reverse of that forming the subject-matter of U.S. Pat. No. 2,991,824. Furthermore, compared with that patent, the system serving to push-in the impression is located downstream of the forming device. Advantageously, this inversion device is located between the tapes 1 and 2 (but it is also possible to place it between the tapes 2 and 3, if appropriate). This device is placed at a point on the line at which the hydration of the hydraulic binder has commenced. Preferably, this device is located at a point corresponding to 5% to 30% hydration and/or at a place located between 40 and 110 m along the length of the conveyor belt 7 (for example for a line with a speed of about 70 m/min).

This device 300 is placed between the tapes 1 and 2, referenced 301 and 302 respectively. These tapes are driven by rollers 303 and 304 respectively. The device 300 comprises, on the one hand, a secondary forming device 300*a*. This comprises, on a frame (not shown), a belt 305 rotating at a linear speed equal to the speed of the tapes 301 and 302. Thus any slippage of the facing is prevented. Fixed to this belt 305 are one or more forming laths 306. In the description that follows, reference will be made to only a single lath, but, depending on the dimensions of the devices, the desired boards, etc., it is possible to use several laths. This belt is mounted on rollers 307 and 308, at least one of which is preferably driven. A flat sliding plate 309, for example made of marble, is placed between the preform and the belt 305 so that these are in contact over a flat surface. Facing this part is a "backing device" 300*c*. This comprises, on a frame (not shown), a belt 310 rotating at a linear speed equal to the speed of the tapes 301 and 302, this belt 310 being mounted on rollers 311 and 312, at least one of which is preferably driven. A flat sliding plate 313, for example made of marble, is placed so as to be facing between the preform and the belt 310, in a similar arrangement to that of the plate 309 and the belt 305.

In operation, the forming lath 306 comes opposite the upper impression 12 in the preform. Having done this, when the lath 306 passes at the same time as the preform between the two plates 309 and 313, the impression is "chased" on the other side of the preform. What is therefore obtained is a preform arriving on the forming tape 302 that has a recess corresponding to a transverse feathered edge (on the same side of the board as the longitudinal feathered edges).

Thus, the preform passes between the two belts 305 and 310, which are preferably driven at the run speed of the preform. The preform is therefore in contact only with moving elements, so that the preform/belt relative movement is zero. There is therefore no friction.

The dimensions of the device (along its length) are of the order of a few meters (typically there is contact over 5 to 10 m), generally sufficient to ensure that the secondary forming operation is carried out.

Means (not shown) for adjusting the pressure exerted by this "backing device" may be provided. These may in particular be rams or counterweights that can exert an adjustable pressure on the assembly.

Synchronization means (not shown) are preferably provided so that the secondary forming lath 306 is substantially opposite the impression 12. It is possible to use a cutting system composed of a wheel placed over the top of the preform and rotated by the movement of the latter. The wheel is graduated and coupled to a counter, which actuates the desired devices. It is also possible to use a system comprising a step of marking the facing of the preform (for example a point), and the detection of this mark and the consequential actuation of the devices. Among these devices actuated by the detection of the mark, mention may be made of those for making the impression 12 or 12*a*, or introducing the lath (6, 23) or for rotating the belt 305 carrying the lath 306, for cutting the preform after the forming step, etc.

Figure 18:
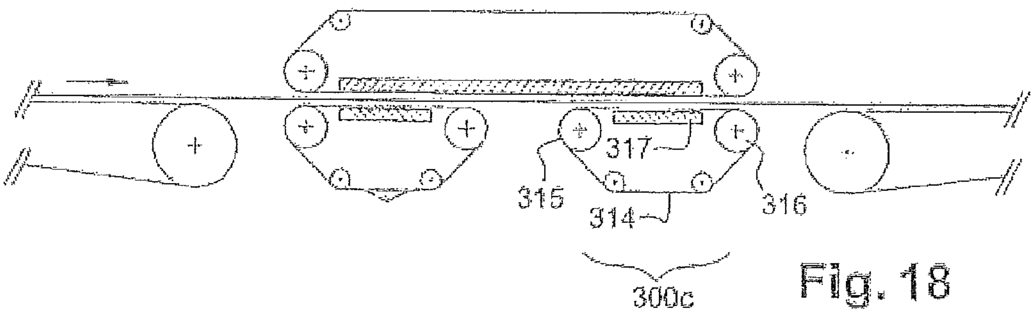
FIG. 18 shows schematically an alternative embodiment of a secondary forming device.

Another embodiment is shown in FIG. 18 (the same references as in FIG. 17 are not used). In this embodiment, the device 300 furthermore includes a calibrating device 300*c*. The lath 306 is retracted when the belt 305 turns around the roller 308; the preform then enters the calibrating device 300*c*. This comprises, on a frame (not shown), a belt 314 rotating with a linear speed equal to the speed of the tapes 301 and 302, this belt 314 being mounted on rollers 315 and 316, at least one of which is preferably driven. A flat sliding plate 317, for example made of marble, is placed between the preform and the belt 314 in a similar arrangement to that of the plate 309 and the belt 305.

A smoother of the same type as that described in the case of the second embodiment may optionally be provided.

Fourth Embodiment

This embodiment corresponds to the case in which the device of FIG. 17 or FIG. 18 is reversed, that is to say the forming lath 306 is placed not for embossing the impression and forming the transverse feathered edges on the same side as the longitudinal feathered edges, but on the contrary to "consolidate" the impression and the shaped recess. According to this embodiment, by applying the forming lath at a stage when the hydraulic binder has commenced its hydration it is possible to have, as above, ideal preform consistency at the moment of the secondary forming operation. As in the case of the third embodiment, what is obtained is a board with four feathered edges, the longitudinal and transverse edges being on both sides of the board. The advantages will be described below in relation to the method of constructing an interior structure according to the invention.

Fifth and Sixth Embodiments

These embodiments correspond to the cases in which the impression 12 is replaced in the second and third embodiments above by the impression 512*a*. Opposite effects are therefore obtained.

In the embodiments above, the length of the lath 306 is approximately equal to the width of the preform. Moreover, the lath used in the invention, and especially the lath 306, may be a parallelepipedal section, but also a section in the form of a triangle, in general an isosceles triangle, the base of which is parallel to the belt 7.

It will also be possible to have modified third and sixth embodiments. It will be recalled that the third and sixth embodiments have in common the fact that the impression 12, alternatively 12_a_, is "pushed-in" by a device beneath the preform, or alternatively above the preform. In the third and sixth embodiments, the impression is "pushed-in" in its entirety, that is to say the facing paper is substantially flat once the impression has been "pushed-in". Provision may be made for the action consisting in pushing-in the impression to be only partial, that is to say a depression remains on each side of the board, one being more pronounced than the other. For example, it is possible to adjust the device 300 so that the ratio of the depths of the depressions on each side is between 1 and 10, preferably between 2 and 5. For example, for a standard BA13 board with a thickness of 12.5 mm, the depth of the depression on the "pushed-in" side may be 4 mm, while the depression on the original side may be 1.5 mm.

Method of Constructing an Interior Structure; Board Used in this Method

According to another aspect, the subject of the invention is a method of constructing an interior structure using boards with four feathered edges, two feathered edges of which are on one side, while the other two are on the other side of the board. Such boards may be obtained by the first embodiment (with the impression 12), the fourth embodiment and the fifth embodiment, and also the modified third and sixth embodiments. Such a board is shown schematically in FIG. 19. It may be seen in this figure that the featherings are arranged opposingly on each side of the board (the edge featherings are on the side with the cream facing (10), whereas the end featherings are on the other side, on the "grey" side (25_a_)). The dimensions of the featherings 25_a_ are in general of the same order of magnitude as those of the featherings 25 (these corresponding to the dimensions of the lath in the case of the fourth or fifth embodiment or of the elongate means 110 comprising the wires 111 in the case of the first embodiment for example). The feathering 25_a_ may therefore have a depth of between 0.5 and 4 mm, preferably between 1.5 and 4 mm. The width of the feathering may be between 2 and 15 cm, preferably between 5 and 10 cm. The longitudinal featherings have the standard dimensions in the art, such as those conventionally given by the tapes.

The method of constructing an interior structure (a partition, which may be vertical, inclined or horizontal, or a false ceiling) according to the invention comprises the following steps (and which will be described in greater detail below):

a) the boards according to the invention (for example such as that shown in FIG. 19) are placed on a support, the boards being butted together along the feathered edges;
b) the boards are fixed to the support along the feathered edges;
c) the boards are joined together with at least one joint cement; and, optionally,
d) the joints are finished off with a complementary finish plaster.

During step b), the transverse feathered edges, which are on that side of the board not visible to the fitter, are "turned up" owing to the effect of the fastening by screws, nails or the like, as this region of the board is clamped onto the support. Having done this, they then reveal a feathering on the same side of the board as the longitudinal feathered edges (or edge featherings). Thus, feathered edges are therefore obtained at each joint between the boards.

According to one embodiment, the transverse feathered edges (25_a_), namely those that are on the grey facing side, are identified by the specific marking on the cream facing side in such a way that the user (the plasterer who is fitting the partition) knows that there are feathered edges on the grey facing side. When pairing boards, the user will therefore know that there are such featherings and therefore he will be able to treat the joints accordingly. The marking of these featherings may take any appropriate form, such as a repeated pattern. The presence of this marking offers an advantage when two boards according to the invention are butted together along the transverse featherings; this is because, when the transverse feathered edge is butted, for example, against a wall, the marking on the cream facing indicating the presence of this feathering on the grey facing has no appreciable influence on the fitting operation nor on the way in which the joints are treated.

Figure 20:
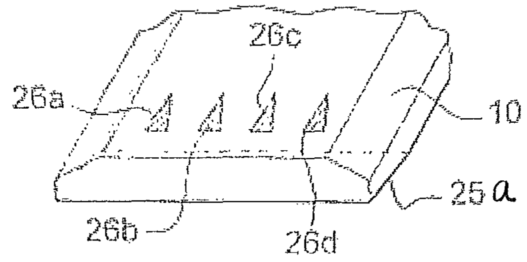
FIG. 20 shows schematically the board of FIG. 19 with a change in position of the faces.

This marking is in particular identified in FIG. 20 by the symbols 26_a_, 26_b_, 26_c_ and 26_d_ near the feathered edges (25_a_). This marking is present on the cream side and identifies the transverse feathered edge intended to be paired with a transverse edge of the same type of a second board according to the invention.

This marking furthermore makes it possible to identify the width of the transverse feathering (25_a_) and to adapt the joint treatment accordingly, especially by using a tool or spatula of suitable size. For example, the plasterer may simply apply plaster, in particular the top coat, only at the marks and be guided by them.

Furthermore, the marking may comprise repeated marks. If the valley formed by the feathered edges (25_a_) is obtained by "inversion" during step b), it is preferable to use a sufficient number of screws to ensure that this inversion operation can be carried out easily. For example, it is possible to use three, preferably five, screws, as is conventionally done, but it is preferred to use from six to ten, advantageously seven, repeated marks. The number of marks will therefore correspond to the number of screws to be used.

The boards with the marking are manufactured as described above, except that the face paper is printed before receiving the plaster. This may be printed in situ, or else a reel of already printed paper may be used. The production line then includes suitable printing means.

The subject of the invention is also a novel hydraulic-binder-based board with four feathered edges and a method of constructing interior structures using such boards.

These boards do not have the drawbacks, while they are being assembled, which are generally associated with conventional boards with four feathered edges, as indicated below.

Plasterboards are known and in general such boards comprise two longitudinal feathered edges. When the boards are butted together along the transverse edges, an additional thickness is necessarily formed along the joint. A first technique consists in offsetting the rail of the framework by about 2 mm so as to create the equivalent of a feathering. However, this technique is difficult to implement owing to the discrepancies that necessarily arise.

Another technique that has been proposed consists in using boards with four feathered edges. Many documents have described their preparation. These boards have in common four, longitudinal and transverse, feathered edges so that joints using a joint cement may be made along the four sides. At the present time, all the boards have approximately similar feathered edges in terms of dimensions, the width and depth of the featherings being approximately the same for the four edges. Although the use of four feathered edges has certain advantages, it still has drawbacks. This is because a feathered edge has a width in general between 40 and 80 mm, typically 60 mm; these values are imposed by the standards in force and by current practice. However, the tool used to apply the tape bonding cement (when one is used) and the joint cement generally has a width of greater than 120 mm, thereby necessarily creating overthicknesses at the intersection of the joints during application of the cement to the transverse joints, thus reducing the attraction of boards with four feathered edges, which are already penalized by their higher cost.

U.S. Pat. No. 4,397,123 discloses a board according to two embodiments. According to the first embodiment, the board ends comprise a removable portion, which, after it has been removed, gives an edge in the form of a notch. This notch, once in place, is "inverted" in order to form a valley intended to receive the plaster. This solution is technically very complicated; no industrial manufacturing process is described. According to a second embodiment, the board disclosed has a feathering along the grey side of the board, the width of this feathering being 12 inches, i.e. more than 30 cm. Again, there is no description of any process allowing this second embodiment to be obtained.

Figure 19:
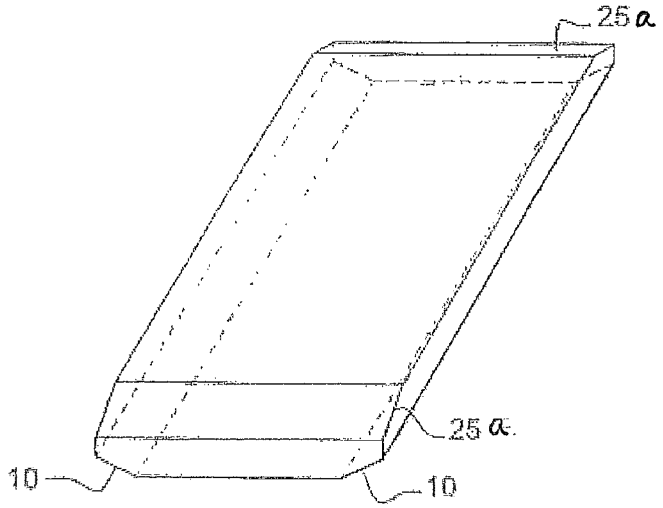
FIG. 19 shows schematically a board made of a hydraulic binder according to the invention.

FIG. 19 shows a board according to a first embodiment. The board conventionally comprises a hydraulic binder, in general gypsum plaster, between two facings. The facing materials may consist of sheets of paper or card, glass mats or mats of any material known to those skilled in the art as being able to be used as facing material.

The board has, on one side, two first parallel feathered edges (10) and, on the other side, two other, second, parallel feathered edges (25*a*) that are perpendicular to the first ones. The featherings are opposingly arranged on each side of the board (the edge featherings are on the cream facing side (10), while the end featherings are on the other side, i.e. the "grey" side (25*a*). The depth of the feathering is in general between 0.5 and 4 mm, preferably between 0.5 and 3 mm, more preferably between 0.6 and 2.5 mm, or even between 0.6 and 1.8 mm and advantageously between 0.8 and 1.8 mm or 0.5 and 1.5 mm. The width of the second featherings (25*a*) here is specific in the embodiment of the invention and is in general between 100 and 200 mm, preferably between 120 and 180 mm or between 150 and 200 mm or between 100 and 150 mm. The first longitudinal featherings have a depth of approximately the same magnitude, whereas their width is appreciably smaller, for example between 40 and 80 mm. In particular, the ratio of the widths of the second transverse featherings to the first longitudinal featherings is in general between 1.5 and 5, preferably between 2 and 4.

In one embodiment, the ratio may also be inverted, the longitudinal edges then having a width greater than that of the transverse edges. In yet another embodiment, the four edges have large widths.

Figure 21:
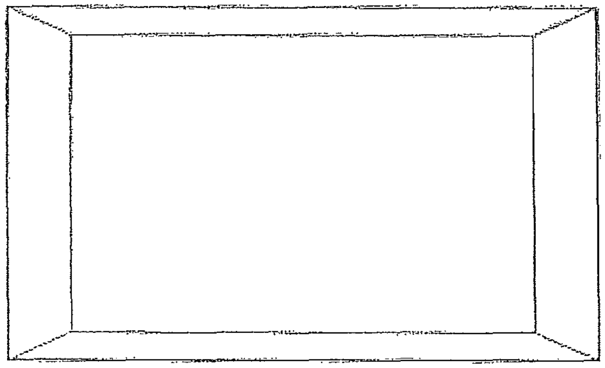
FIG. 21 shows schematically a board made of hydraulic binder according to the invention according to a second embodiment.

FIG. 21 shows a board according to a second embodiment, in top view. In this case, the board has the four feathered edges on the same side of the board. The dimensions given with reference to the embodiment shown in FIG. 1 and the other embodiments also presented in relation to this FIG. 19 apply here mutatis mutandis.

Figure 22:
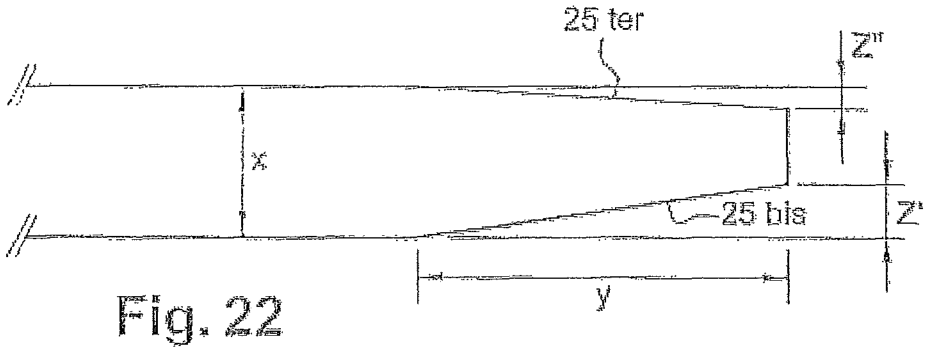
FIG. 22 shows schematically in cross section a feathered edge of a board according to the invention.

FIG. 22 shows a sectional view of a specific feathered edge according to the invention. In this embodiment, the feathering is present on both sides of the board. In this case, the board furthermore includes two third feathered edges (25*b*) that are parallel to the second feathered edges (25*a*), on the other side of the board. The dimensions are given again here, namely: X, the thickness of the board, conventionally between 6 and 25 mm; Y, the width of the feathering, between 100 and 200 mm, preferably between 120 and 180 mm or between 150 and 200 mm, as above; Z' (for example the depth of the second featherings 25*a*) and Z" (for example the depth of the third featherings 25*b*) such that Z'+Z" is between 0.5 and 4 mm, preferably between 0.5 and 3 mm, more preferably between 0.6 and 2.5 mm, or even between 0.6 and 1.8 mm, advantageously between 0.8 and 1.8 mm or 0.5 and 1.5 mm. The ratio of the values of Z' and Z", or Z'/Z", is for example between 1 and 10, preferably between 2 and 5.

The presence of these featherings along each side offers an additional advantage. When the feathered edges (25*a*) are present along the side opposite the feathered edges (10), during the fitting operation they are "inverted", as indicated above. Bending therefore occurs, with a relatively large radius of curvature. The presence of the feathered edges (25*b*) allows better delimitation of the final valley formed by the inversion of the feathered edges (25*a*). A true valley of the type of those formed by conventional featherings (namely those with approximately the shape of an isosceles triangle) is obtained. This allows optimum treatment of the joint without excessive consumption of cement and with perfect flatness.

The boards with four feathered edges may be prepared using various processes. In the case of the board with four feathered edges on the same side, the processes are known. For example, it is possible to use the processes described for example in U.S. Pat. No. 2,991,824 or U.S. Pat. No. 2,246,987 or in the applications in the name of the Applicant, for example PCT/FR03/01373; PCT/FR03/02281, PCT/FR03/00118, PCT/FR03/12880 and PCT/FR03/00606. In the case of the board with the second (transverse) feathered edges on the side opposite that bearing the first (longitudinal) feathered edges, it is possible to use:

- the process described above with reference to the previous figures;
- a variant of the process according to U.S. Pat. No. 4,781,558, in which the drum is modified so as to bear at least one rib or protuberance along the axis of the drum;
- a process making use of the forming tape according to U.S. Pat. No. 2,991,824 combined with upper rollers forming the longitudinal featherings according to U.S. Pat. No. 1,676,318 or U.S. Pat. No. 2,246,987;
- a process in which a board is pressed, for example in the wet state, in a suitable mould; and
- a process in which the transverse feathered edge is obtained by resawing into the thickness and rebonding.

The method of constructing an interior structure (a partition, which may be vertical, inclined or horizontal, or a false ceiling) according to the invention comprises the following steps:

a) the boards according to the invention (for example as shown in FIG. 19 or 21) are placed on a support, the boards being butted together along the feathered edges;
a) the boards on the support are fixed along the feathered edges;
b) the boards are joined together with at least one joint cement; and, optionally,
c) the joints are finished with a complementary finish plaster.

As a preliminary, it should be pointed out that the present method may or may not use a tape bonding cement; it is possible to use a tape, for example a paper tape, or a tape made of glass-fibre fabric, which may or may not be self-adhesive. The tape bonding cement, when it is used, may be identical to or different from the joint cement. Likewise, this joint cement may be identical to or different from the complementary finish plaster, when such a complementary finish plaster is used.

Figure 23A:
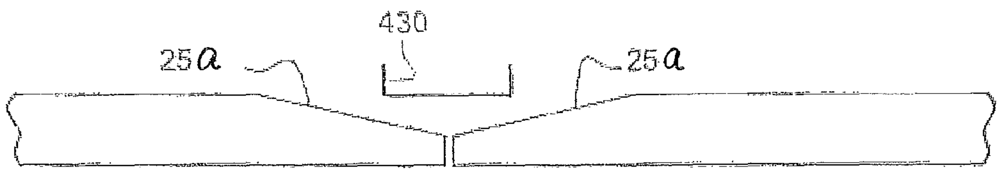
FIGS. 23A and 23B show a diagram of the “reversal” of the feathered edges of a board according to a first embodiment.
Figure 23B:
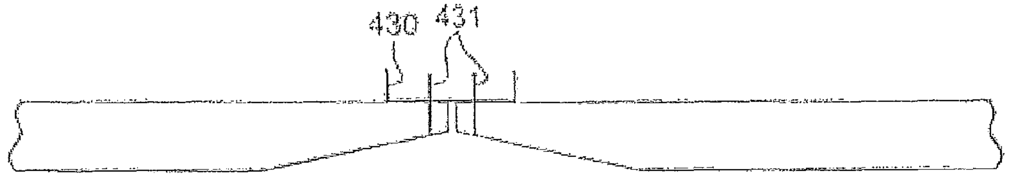

In the case of the board with transverse feathered edges on the opposite side to that bearing the longitudinal feathered edges, during step b) the transverse feathered edges, which are on that side of the board not visible to the fitter, are "turned up" owing to the effect of the fixing by screws, nails or the like, since this region of the board is clamped onto the support. Having done this, they then reveal a feathering on the same side of the board as the longitudinal feathered edges (or edge featherings). Feathered edges at each junction of the boards are therefore obtained. This is illustrated in FIGS. 23A and 23B in which the support 430 receives the transverse feathered edges 25*a*, which are "turned up" owing to the effect of the fixing by screws, nails or the like (these being identified in the figures by the reference 431).

In the case of the board with transverse feathered edges on the same side as that bearing the longitudinal feathered edges, step b) is the conventional step during laying.

The invention offers one particular advantage over the boards known from the prior art with four feathered edges. This advantage will be more apparent from the figures that follow.

Figure 24A:
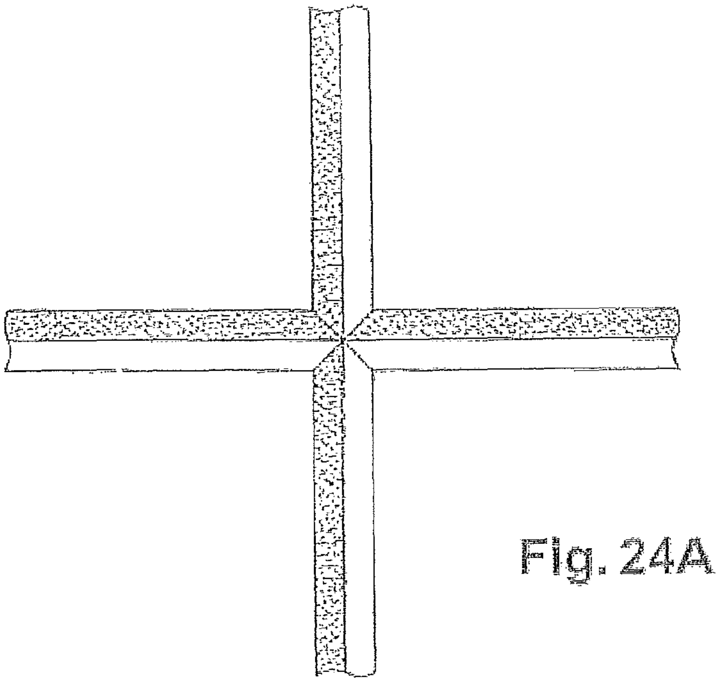
FIGS. 24A, 24B and 24C show a diagram of how boards with four feathered edges according to the prior art are fitted together.
Figure 24B:
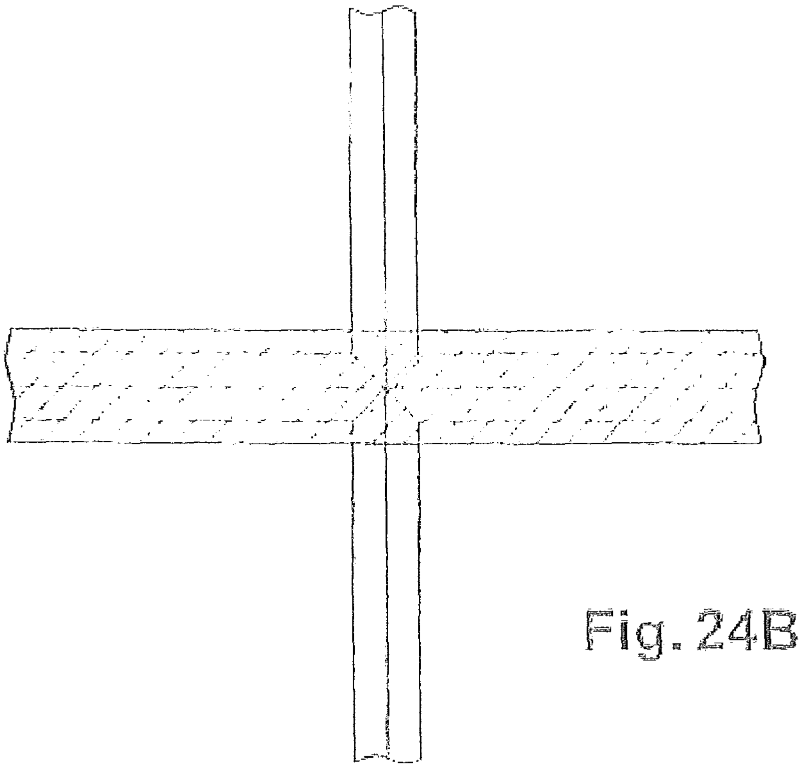
Figure 24C:
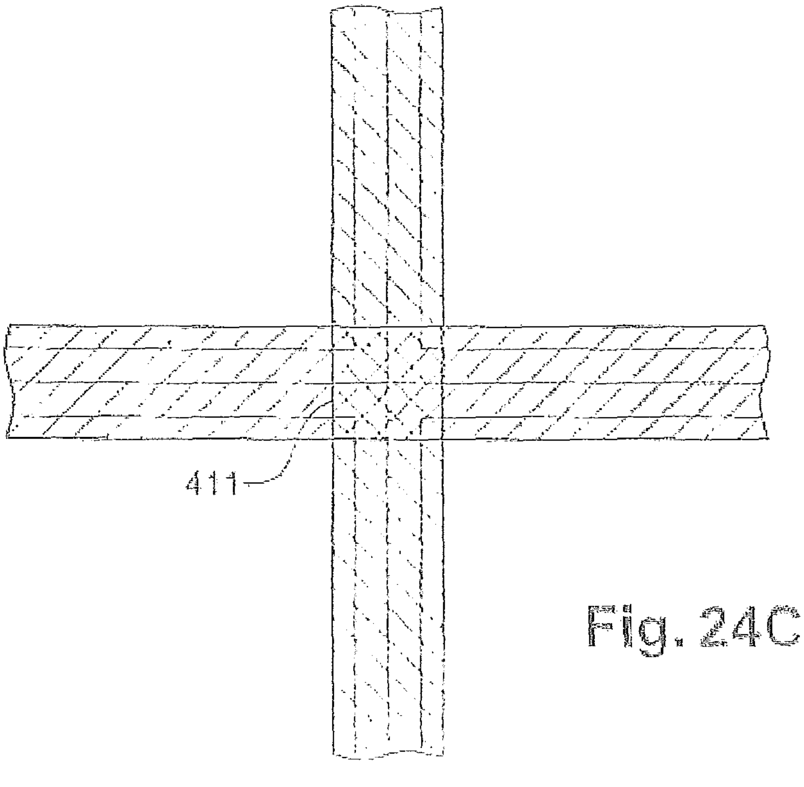

FIGS. 24A, 24B and 24C show a diagram of how conventional boards with four feathered edges fit together. FIG. 24A shows the boards butted together. FIG. 24B shows the boards with one joint (after tape has been placed in both joints) that is treated with a layer of joint cement. The hatched region represents the region in which the cement has been applied. Conventionally, there is an overthickness along the sides of this application region (on the boards bordering the feathering). FIG. 24C shows the boards, of which the second has a joint treated with a layer of joint cement. The hatched region again represents the region in which the cement is applied. Conventionally, there is an overthickness along the sides of this application region (on the boards bordering the feathering). However, a large overthickness also occurs at the point where the joints cross, this being identified by the reference 411 in the figure. This is because the first overthickness obtained in the steps shown in FIG. 24B adds to the overthickness obtained in the steps shown in FIG. 24C.

Figure 25A:
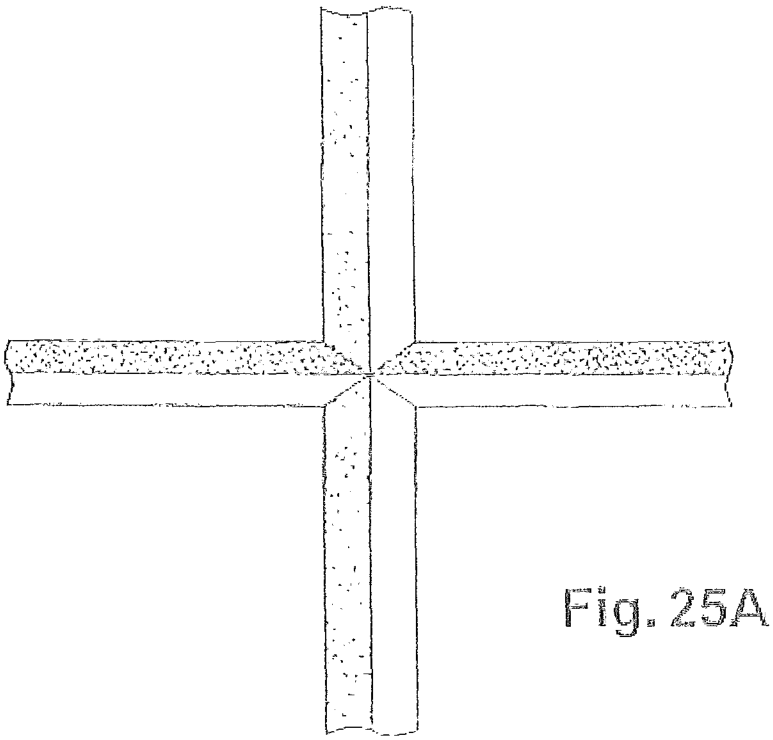
FIGS. 25A, 25B and 25C show a diagram of how boards with four feathered edges according to the invention are fitted together.
Figure 25B:
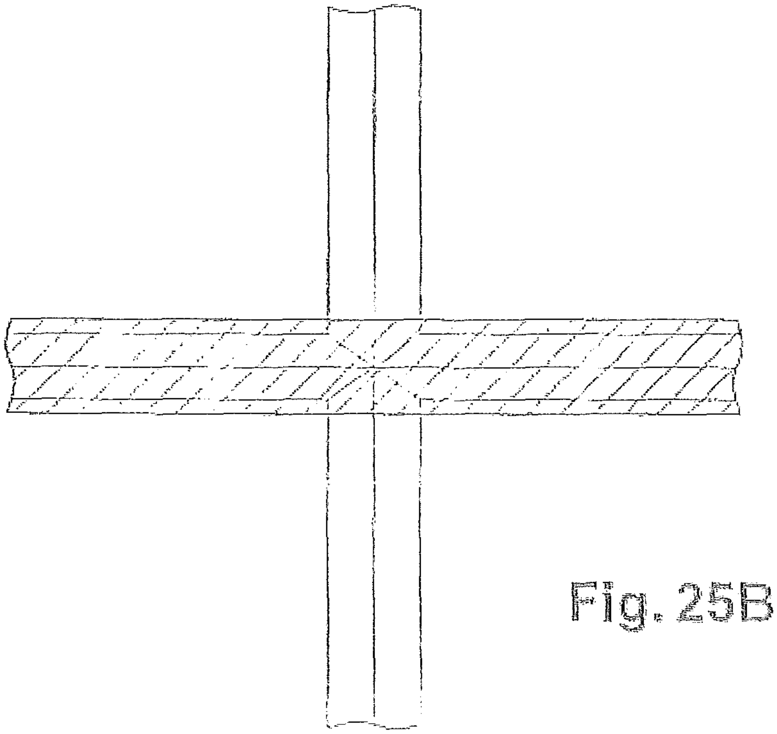
Figure 25C:
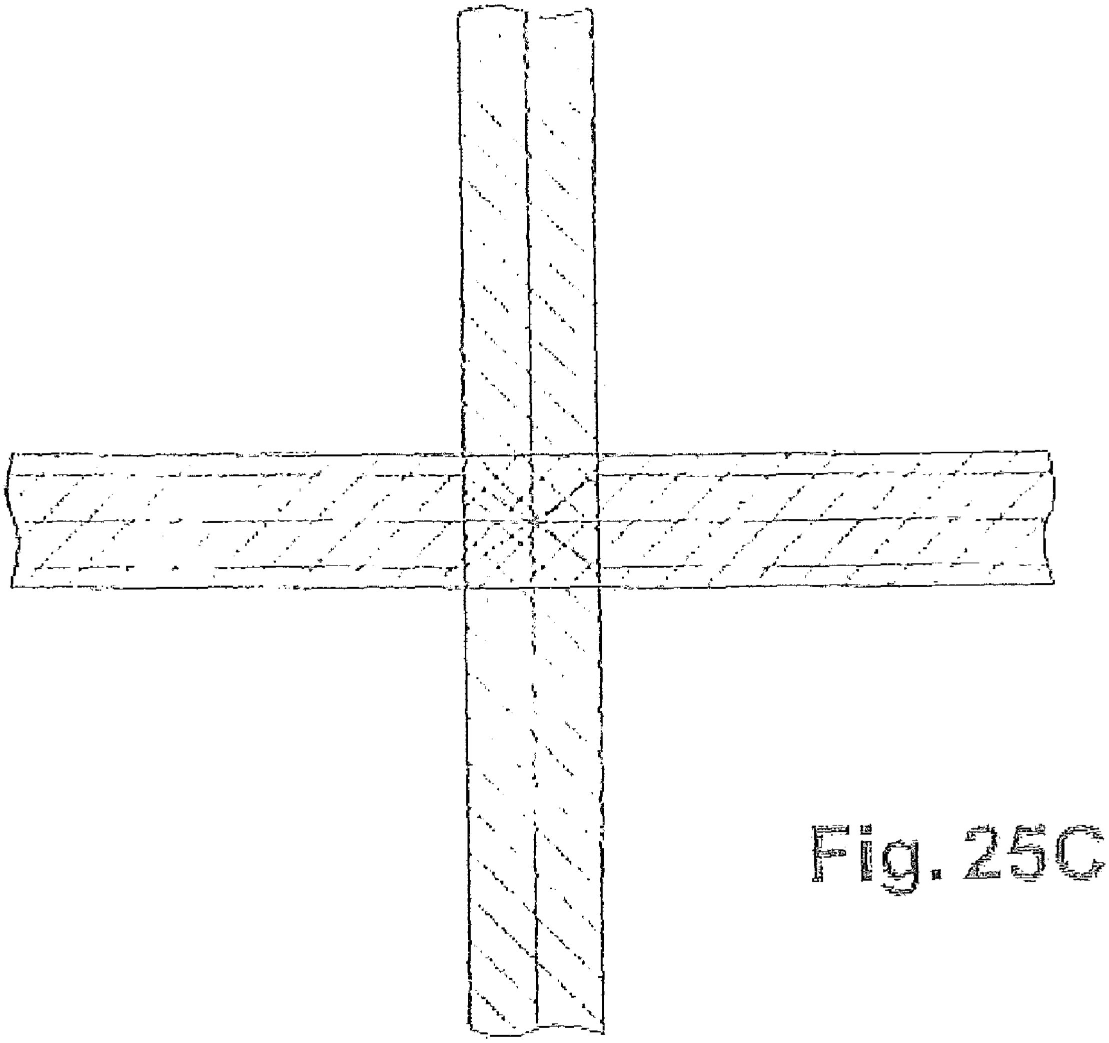

FIGS. 25A, 25B and 25C show diagrams of the way the boards with four feathered edges according to the invention fit together. FIG. 25A shows the boards butted together with, as the case may be, the edges turned up. Once the boards according to the invention have been fitted together, they present featherings on the visible side, as was explained above. FIG. 25B shows the boards with one joint (after tape has been fitted in both joints) treated with a layer of joint cement. The hatched region shows the region in which the cement is applied. Conventionally, there is also an overthickness along the sides of this application region (on the boards bordering the feathering).

FIG. 25C shows the boards in the which the second joint is treated with a layer of joint cement. The hatched region again shows the region in which the cement is applied. This time, the tool having smaller dimensions compared with the size of the feathered edges, the cement is localized in the valley formed by the large feathered edges. Thus, at the point where the joints cross, there is no longer an overthickness that adds to the first overthickness obtained in the step shown in FIG. 25B. Thus, a joint intersection with no overthickness is obtained and therefore the surface is consequently perfectly flat.

It will be preferable to use a tool whose width is more than twice the width of the said first parallel feathered edges (10) and less than or equal to twice the width of the said other parallel feathered edges (25*a*).

The invention provides yet another advantage. During the operation of fitting the boards to the suspended metal supports, there is often an abutment of two boards along a rail. When this rail is offset, following a deficient fitting, this offset is visible with the conventional boards. Thanks to the boards according to the invention, since the feathering is of relatively large dimensions, this offset is no longer visible to the eye.

The invention offers yet another advantage. If the first, second or both feathered edges are of larger size, it is possible to use larger amounts of plaster (for a greater thickness), especially joint cement. Thus, during any rubbing-down, there is less risk of the tape becoming visible (by the presence of fluff or by its visible spectrum through the plaster).

As above, marking may be used. The marking may also be inserted in the case of a board in which the broad feathered edge is on the same side as the other feathered edges, especially when the depth is small and it makes identification of the said feathered edge difficult.

It does not matter whether the boards are fitted together with crossed joints or with aligned joints.

The invention claimed is:

1. A production line for producing hydraulic-binder-based boards from a preform comprising a facing material covered with a hydraulic binder composition and supported by a conveyor belt, comprising at least two forming tapes fitted with longitudinal tapes, the line further including a device that produces an impression in the preform before the first forming tape, the impression being produced in an upper part of the preform, wherein the device for forming the impression in a hydraulic-binder-based preform comprises at least:

a frame;

two first pulleys supported at a first end of the frame and two second pulleys at a second end of the frame;

the first pulleys and the second pulleys being in parallel planes;

the pulleys facing each other being identical;

two transmission belts wrapped respectively around the first pulleys and the second pulleys; and at least one wire fixed removably to the belts and extending between the belts so that its longitudinal axis is parallel to the axis of rotation of the pulleys;

the distance between the transmission belts of the device being at least equal to the width of the preform and the device being placed so that when its transmission belts turn, its wire(s) creates(create) an impression in the preform.

2. A production line for producing hydraulic-binder-based boards from a preform comprising a facing material covered with a hydraulic binder composition and supported by a conveyor belt, comprising at least two forming belts fitted with longitudinal tapes, the line further including a device for making an impression in the preform before the first forming belt, and a device for introducing, under the preform between two forming belts, a lath opposite the point or at the point where the impression has been made.

3. Production line according to claim 2, wherein the device for forming the impression in a hydraulic-binder-based preform comprises at least:

a frame;

two first pulleys supported at a first end of the frame and two second pulleys at a second end of the frame;

the first pulleys and the second pulleys being in parallel planes; the pulleys facing each other being identical;

two transmission belts wrapped respectively around the first pulleys and the second pulleys; and at least one wire fixed removably to the belts and extending between these belts so that its longitudinal axis is parallel to the axis of rotation of the pulleys;

the distance between the transmission belts of the device being at least equal to the width of the preform and the device being placed so that when its transmission belts turn, its wire(s) creates an impression in the preform.

4. Production line according to claim 2, wherein the device for introducing a lath under the preform between two forming belts opposite the point or at the point where the impression has been made comprises at least:

a laths magazine;

at least one lath; means for extracting, one at a time, a lath from the laths magazine;

means for receiving the extracted lath;

means for moving the extracted lath in a direction parallel to its length;

means for supporting the moved lath; and means for sliding the lath under the facing material.

5. Production line according to claim 2, in which the device for introducing a lath under the preform between two forming belts, opposite the point or at the point where the impression has been made, comprises at least: a secondary forming device, the secondary forming device comprising:

a belt supporting a forming lath, this belt being mounted on rollers, this belt sliding over a first plate, and facing the other side of the preform; and a backing device, the backing device comprising: a belt mounted on rollers, the belt sliding over a second plate; the belts having a linear speed approximately equal to that of the forming belts.

6. Production line according to claim 5, which further includes, downstream of the secondary forming device and also facing the backing device: a calibration device, the calibration device comprising: a belt mounted on rollers, the belt sliding over a plate; the belt having a linear speed approximately equal to that of the forming belts.

7. Production line according to claim 2, wherein the hydraulic binder comprises gypsum plaster.

8. Production line according to claim 5, wherein the first plate is made of marble.

9. Production line according to claim 5, wherein the second plate is made of marble.

10. Production line according to claim 6, wherein the plate is made of marble.

* * * * *